United States Patent
Wajnikonis

(10) Patent No.: US 8,888,411 B2
(45) Date of Patent: Nov. 18, 2014

(54) CATENARY LINE DYNAMIC MOTION SUPPRESSION

(76) Inventor: Krzysztof Jan Wajnikonis, Houston, TX (US)

( * ) Notice: Subject to any disclaimer, the term of this patent is extended or adjusted under 35 U.S.C. 154(b) by 799 days.

(21) Appl. No.: 12/772,992

(22) Filed: May 3, 2010

(65) Prior Publication Data

US 2010/0215440 A1 Aug. 26, 2010

Related U.S. Application Data

(63) Continuation of application No. 11/813,162, filed as application No. PCT/US2005/047051 on Dec. 28, 2005, now abandoned.

(60) Provisional application No. 60/593,269, filed on Jan. 3, 2005.

(51) Int. Cl.
*B63B 22/18* (2006.01)

(52) U.S. Cl.
CPC ................... *B63B 22/18* (2013.01)
USPC ......................................... 405/211

(58) Field of Classification Search
CPC ..... B63B 2021/54; E21B 17/01; F15D 1/009; F16L 57/00; F16L 1/20; F16L 1/123
USPC ................. 114/243; 405/195.1, 211
See application file for complete search history.

(56) References Cited

U.S. PATENT DOCUMENTS

| | | | | |
|---|---|---|---|---|
| 4,090,463 A * | 5/1978 | Soderberg | | 114/294 |
| 4,474,129 A * | 10/1984 | Watkins et al. | | 114/243 |
| 4,509,448 A * | 4/1985 | Pease et al. | | 114/293 |
| 4,906,137 A * | 3/1990 | Maloberti et al. | | 405/224.3 |
| 5,582,252 A * | 12/1996 | Richmond et al. | | 166/352 |
| 5,722,340 A * | 3/1998 | Sweetman | | 114/243 |
| 5,738,034 A * | 4/1998 | Wolff et al. | | 114/243 |
| 6,048,136 A * | 4/2000 | Denison et al. | | 405/211 |
| 6,561,734 B1 * | 5/2003 | Allen et al. | | 405/216 |
| 6,695,540 B1 * | 2/2004 | Taquino | | 405/216 |
| 6,896,447 B1 * | 5/2005 | Taquino | | 405/216 |
| 6,953,308 B1 * | 10/2005 | Horton | | 405/211 |
| 7,147,402 B2 * | 12/2006 | Edfeldt | | 405/159 |
| 2007/0231077 A1 * | 10/2007 | Burgess | | 405/216 |

OTHER PUBLICATIONS

Christopher (=Krzysztof) J. Wajnikonis, Steve Leverette, Improvements in Dynamic Loading of Ultra Deepwater Catenary Risers, OTC 20180, Houston, Texas, May 4-7, 2009.

* cited by examiner

*Primary Examiner* — Tara M. Pinnock

(57) ABSTRACT

This invention introduces three-dimensional (3D) damper arrangements that are used to suppress dynamic motions of a subsea line like a riser, on which the dampers are installed. Damping surfaces (shapes) are mounted on the line so that their combined drag per line unit length dampens motions in 3 mutually perpendicular directions: axial, in-plane (IP) and out-of-plane (OOP). 3D suppression is provided by integral 3D dampers or by combining IP-OOP dampers like strakes with neighboring axial dampers. Increased line motions suppression is achieved by decoupling, particularly on dampers mounted in regions of high line curvature and/or small effective tension. This invention also presents Short Lazy Wave (SLW) configurations of rigid catenary risers, which are also used to suppress dynamic motions. 3D dampers can be used together with SLWs. Motion suppression is introduced to reduce dynamic stresses and to increase fatigue life of the lines.

19 Claims, 5 Drawing Sheets

CATENARY LINE DYNAMIC MOTION SUPPRESSION

CROSS-REFERENCE TO RELATED APPLICATIONS

This application claims the priority of U.S. Provisional Patent Application Ser. No. 60/593,269 filed Jan. 3, 2005 and entitled: "Catenary Line Dynamic Motion Suppression Arrangement" the disclosure of which is hereby incorporated by reference in its entirety. This application is being filed in continuation to Utility patent application Ser. No. 11/813,162 filed Oct. 9, 2007, now abandoned.

BACKGROUND OF THE INVENTION

1. Field of the Invention

This invention relates to lines used to connect subsea equipment to related equipment at or near the sea surface.

2. Description of the Related Art

Petroleum exploration and production is increasingly being conducted off-shore and at ever deeper locations. Typically, a mobile offshore drilling unit ("drilling rig") is used to create a well. Once the well is completed, a production platform or a buoy is installed at the site to recover the petroleum products which may subsequently be loaded onto a tanker or pumped via pipelines to on-shore facilities.

Exploration and production platforms take many forms. The appearance and basic features of various types of off-shore platforms are obvious to anybody skilled in offthore engineering and are widely described in technical literature. Examples include ships (mostly tanker-like Floating Production Systems—FPSs and FPSOs—FPSs with off-loading), semi-submersibles (including deep draft semisubmersibles), Tension Leg Platforms (TLPs), compliant and articulated columns and towers, guyed towers, SPAR platforms, jacket (fixed) platforms and jack-up rigs.

It is noted, that many riser, umbilical, hose, cable, etc. lines that are relevant to this specification have their top ends supported for example by buoys, columns, etc. that cannot be classified as platforms.

Lines that are relevant to this specification are used in order to:

transport fluids in both directions between locations at or near the surface and at or near the bottom (examples include import and export lines transporting hydrocarbons, water and gas injection lines, gas lift lines, etc.); in addition to transporting fluids, risers contain fluid pressure and support their structural loads, transfer electrical and hydraulic power, transfer information, including control, monitoring, data, telecommunication, transfer loads (examples: tendons, tethers, cold tubing, etc., many risers deployed share mooring loads with 'regular' moorings).

In particular, oil and gas petroleum products are recovered to the surface using production and test risers.

Export risers are used to transport petroleum products from fixed or floating structures, vessels or buoys to export pipelines that can be connected to other offshore structures or to locations onshore.

Water and gas injection risers as well as gas lift risers typically transport fluids from the surface to the vicinity of the seabed.

Drilling risers are used for drilling below the seabed. Drilling risers incorporate a drill-pipe that in addition to be used for actual drilling transports drilling mud from the surface inside its body. The mud and fragments of drilled rock, etc. are transported back to the surface inside the riser but outside the drill-pipe.

Workover risers are used for well maintenance, including transporting tools far below the seabed.

Umbilical lines perform many specific or combined roles, as required by technological needs.

Jumpers and hoses are used to transport fluids over limited distances, predominantly within limited range of water depth. Those can be used close to the surface, at or close to the seabed or anywhere within the water column.

Hybrid Risers incorporate combinations of some of lines listed above as examples and/or other types of lines that are bundled together. Other bundling configurations are also used offshore, which include piggy-backing, arranging lines in interconnected arrays (example: star-shaped array), stubbing hydraulic lines between connectors of drilling risers, etc.

Lines feature a variety of prior art configurations that are used in offshore and onshore engineering. The two major classes of lines include:

catenary lines (examples: flexible risers, Steel Catenary Risers—SCRs, umbilicals, hoses, jumpers, cables), tensioned lines (examples: tensioned risers including free-standing and hybrid risers, and tendons or tethers).

Most of the said lines are relevant to this specification and they are referred to herein as 'lines'. Many line configurations are used in marine engineering, their basic features are well-known to those skilled in the art, and they are well described in technical literature.

For example Barltrop[1] depicts and describes a representative (but not complete) selection of prior art line configurations used in offshore engineering. Many of the line configurations known are referred to elsewhere in this specification.

[1] Barltrop N. D. P., Floating Structures: a guide for design and analysis, Vol. 2, The Centre for Marine and Petroleum Technology, Publication 101/98, 1998.

U.S. Pat. No. 5,222,453 demonstrates a use of mass enhancing devices mounted on mooring lines and utilized to modify dynamic motions of a moored structure, without affecting static loads in the mooring system, where axial line dynamics is of primary importance. These were of little relevance to this invention that is related to different kinds of lines like risers, umbilicals and hoses.

For the purpose of this specification, in most cases, the details of line description (example: flexible riser, hose or umbilical or even an SCR) is of secondary importance or even of no importance. This is because different lines are subject to the same physics, the same harsh environment and there are many similarities between equipment used with various line configurations, with lines constructed in differing ways, (including using different materials) as well as lines used for vastly differing functional purposes.

A general description and explanation follows of technical issues in offshore and onshore engineering, including problems, as relevant to this invention, as well as that of prior art in the mitigation of some of the said problems.

In particular a simple (free-hanging) catenary configuration, as well as in many implementations of other line configurations are known to experience significant movement near the seabed and interactions with the seabed and/or with structures at the seabed ends of the lines.

It is known to anybody skilled in the art that the Touch Down Zone (TDZ) riser dynamics is of primary design importance in offshore line engineering. The design issues particularly relevant to line engineering are:

Dynamic bending, involving high dynamic bending stresses, particularly in the TDZ; any increase in the dynamic bending stresses reduces the fatigue life of the line structure wherever it occurs.

Dynamic axial loads that also reduce the fatigue life wherever they cause dynamic stresses.

Reductions in the dynamic tension, which includes dynamic line compression with a possibility of buckling or bird-caging of the line.

The dynamics of the TDZ and that anywhere along the lines is originated at the top of the line. That is mostly due to dynamic motions of the supporting structure or vessel that are directly transferred to the line via the line hang-off. Those propagate along lines as dynamic transverse and axial deformations (waves) and as such are responsible for dynamic stressing of the lines.

Additionally, hydrodynamic forces due to waves, also induce in said lines transverse and axial deformations that are also propagated along said lines as transverse and axial waves (deformations).

The dynamic deformations travel along the lines towards the seabed and back towards the surface due to reflections that take place in the Touch-Down Zone, down along a connected pipeline (if applicable) beyond the TDZ, at the line hang-off and at intermediate locations within the water column. Those intermediate reflections occur wherever the line mass per unit length (including the added mass) changes along the length on said line. The physics of said reflections and wave propagation is well understood and it follows the same laws as does the physics of wave reflections in any media. The extent of these line movements, together with the variations in the values and the sign of the effective tension and the variations in the radii of curvature of the said lines, in particular but not exclusively near the seabed, are mitigated by this invention.

Risers and mooring lines are used in many design configurations that include various applications of negatively buoyant clump weights and distributed weights, approximately neutrally buoyant lines and devices as well as positively buoyant discrete and distributed, positively buoyant elements and segments. By that a line is neutrally buoyant it is meant herein that the line is either neutrally buoyant or, more often, approximately neutrally buoyant. Depending on the stage of their use and on the density of the surrounding seawater or fresh water, the fact whether or not a line is positively, neutrally buoyant or negatively buoyant also depends on the density or densities of materials used, materials contained, including fluids contained inside a line or lines. Many materials used degrade and absorb water while in service, accordingly, it is a common practice to supply any buoyant devices as well as any devices desired to be approximately neutrally buoyant with some excess of positive buoyancy.

Quasi static shapes of the lines can be approximated with the use of ideal catenary equations.

The approximation involved is due to neglecting any bending stiffness of the said line or the said line segment. Catenary equations typically approximate well shapes of mooring lines and flexible lines like hoses, flexible pipe, cables and umbilicals. In addition to these, entire SCR lines of the simple (free hanging) configurations as well as for example lazy wave SCRs are well approximated with catenary line equations in deep water, because in the said conditions bending stiffness of even a rigid metal line is negligible in comparison with the scale of the structure deployed. These include all configurations known of said flexible and said rigid lines used in offshore engineering, some of which are described by Barltrop[1].

[1] Barltrop N. D. P., Floating Structures: a guide for design and analysis, Vol. 2, The Centre for Marine and Petroleum Technology, Publication 101/98, 1998.

With regard to the In-Plane (IP) shapes of the catenaries, for lines with distributed weight and buoyancy, (as it follows from the catenary equations) it is noted, that:

negatively buoyant catenary segments have their curvature 'bulging' downwards, neutrally buoyant or near vertical lines are well approximated with straight lines, and positively buoyant segments have their curvature 'bulging' upwards.

Discrete clump weights and buoyant connections (single clamps and buoys) IP result in local 'sharp' points or 'spikes' on catenaries, whereas:

Downward spikes occur at negatively buoyant devices;

No spikes are present at neutrally buoyant devices;

Upward spikes occur at positively buoyant devices.

Three dimensional, real catenaries have their shapes also modified in the Out-of-Plane (OOP) direction due to drag in a current. The above observations for the said IP shapes can be generalized to the shape modifications OOP in the following ways:

Relative differences in drag between segments result in more or less pronounced bulging with a uniform current, for segments generating higher or lower drag, respectively;

Localized (discrete) drag devices that generate higher drag are associated with sharper spikes.

Accordingly, in three dimensions, the combinations of the submerged weight (positive, neutral or negative) and drag forces are responsible for quasi-static shapes of catenary segments, while clump weights, tethered or clamped buoys are responsible for spikes in the shapes, because of the combinations of the weight, buoyancy and drag forces. Drag forces can significantly modify shapes of catenaries, depending on the local strength of current (i.e. current velocity) and the drag coefficient of any particular line segment or a device incorporated. Currents are seldom uniform along said lines. Typically both their velocities and directions vary along the line.

In addition to the above described, quasi-static effects of the weight, buoyancy, and current drag forces, which will be used to optimize the use of this invention on particular examples, line dynamics plays a significant part in the dynamic behavior of the said lines.

Dynamic effects on lines used in offshore engineering can be very complex. The said lines typically experience dynamic wave action that dynamically modifies the said line configurations. Typically, the wave forces act as time variable drag forces and as time variable inertia forces, approximately as described by the Morison Equation. These are modified by the interactions between waves and currents that are complex, but for practical engineering systems it is usually acceptable to approximate the interactions by superposing currents with waves kinematically. Amplitudes of wave forces decrease along lines with the water depth, which in deep water means the force decreases (approximately exponentially) to practically nil at deep water segments of the said lines. In addition to said wave forces, said lines are often subjected also to dynamic resonant excitations due to Vortex Induced Vibrations (VIVs) in currents and waves. In addition to dynamic bending of lines and to their fatigue loading, VIVs are also responsible, wherever they occur, for the increase in the quasi-static drag on the line.

It should also be stated, that many of the said lines are attached at their top ends to floating structures that also move on waves. The motions of the said structures add to the wave generated and other motions of the lines, and they are directly transferred to said lines at their top ends attached to said floating structure. All these motions are transmitted dynamically as line deformation waves along the line catenaries (straight line segments included) both up and down the catenaries with differing velocities, dependent on a nature of the wave motion generated on the line.

In particular, axial waves are transmitted along said lines very fast, approximately at the speed of sound in the materials used.

Catenary tension waves are also transmitted with similar velocities along the line and they result in movements of the entire catenary, almost like a rigid body. A significant portion of the heave transferred to said line can result in motions of this kind and the deformations travel along said lines slightly slower than the acoustic waves. Other motions, together with the remaining part of the heave motion tend to be transmitted along said lines much slower, as transverse deformation waves.

Static and dynamic coupling exists between the torsion of the line and its bending wherever three dimensional bending occurs (torsion waves tend to travel along said lines faster than transverse deformation waves). The latter interactions result in some redistribution of the corresponding oscillation energies, however the amplitudes resulting tend to be small in practice and in most cases these phenomena can be disregarded.

For said lines having multilayer structure, where different materials are used in different layers the wave transfer velocities tend to differ between layers, however the structurally dominant layers tend to control the motions.

All said waves traveling along said lines are subjected to reflections on the lines whenever the mass and line directions change, as well they are subject to dynamic interactions with the seabed. The quasi-static and momentary dynamic shapes of catenary lines are tension controlled, and it is the property of the catenaries, that the effective tension is the lowest at and near the touch down areas to the seabed (or at ends connected to subsea structures), where the (effective) tension-controlled line stiffness is the lowest.

It is often the case that the effective tension near the touchdown becomes periodically negative, making the line susceptible to local buckling, which usually is not desirable and sometimes it is completely unacceptable (example fiber-optic lines).

Riser and pipeline engineering codes that are also relevant to umbilical lines, cables, etc. recommend effective dealing with the problem of the occurrence of negative dynamic effective tensions. These decreases in the effective tension are often accompanied with dynamic reductions in the line radii of curvature. Bird-caging of umbilical or cable lines can occur, rigid or flexible pipes usually have some built-in resilience, but complex local increases in fatigue damage typically result. Often, in presently known designs it is difficult to increase the effective tension and to increase the minimum dynamic bending radii to acceptable levels. Increasing the horizontal tension in the catenaries, which increases also the quasi-static, average effective tension at the touch-down in many known designs is known to often make the dynamic effects described above even worse.

It is noted that the said effective tension is a physical value responsible for the line shape and buckling behavior for lines that include fluid contained pipes, as described by Young and Fowler[2]. Internal fluid pressures inside a rigid or flexible pipe, as well as pressures inside umbilical tubes, together with the external hydrostatic pressure in the surrounding water affect the actual (wall) tension in the line or lines, whereas said effective tension governs the behavior of the line. For some lines, like cables, electrical umbilicals or solid rods, effective tension and the actual tension are equal and they are simply known as tension. However, with the above understanding the term effective tension is used herein for all types of lines, whenever required, because it is more general.

[2] Young R. D., Fowler J. R., Dynamic Analysis as an Aid to the Design of Marine Risers, Transactions of the ASME, Journal of Pressure Vessel Technology, Vol. 100, May 1978.

In particular, the said touch down zone line dynamics is in presently known designs both significant and troublesome for simple, free hanging catenary lines attached to floating structures. Examples of floating structures that are associated with the biggest motions are tankers (FPSs and FPSOs), particularly when they are bow or stern turret-moored. On such designs, all the risers, umbilicals, cables and mooring lines are attached to the turret. The motions of the FPSs and FPSOs are typically the biggest at their bows and sterns, which are also typical locations for turrets. However, many FPSs and FPSOs feature wide beams in order to maximize their deck areas, and accordingly line tops attached to riser banks on vessel sides can also experience high motions. Single Buoy Moorings (SBMs) and Semi-submersible vessels can also transfer considerable motions to catenary lines. Top-end induced motions are typically smaller for articulated or compliant towers, Tension Leg Platforms (TLPs), SPARS, including Truss SPARS and other deep draught vessels, but they are by no means negligible.

In the presently known designs the most effective way of mitigating the problem is to use one of the wave or 'S' configurations, as described by Barltrop[1].

[1] Barltrop N. D. P., Floating Structures: a guide for design and analysis, Vol. 2, The Centre for Marine and Petroleum Technology, Publication 101/98, 1998.

The wave or 'S' configurations are sometimes unavoidable in shallow water conditions and/or with strong variable currents. Because of large horizontal motions of the vessel in these situations (that can be caused by waves, by variable currents or both), one of these configurations has to be selected in order to reduce the maximum dynamic effective and wall tensions in the catenary to an acceptable level.

In ultra deepwater conditions, the selection of for example lazy wave for a flexible, cable or an umbilical line or for SCRs can also be the best solution because of the line weight in its operational or installation configuration. In particular, at present, it might be not possible to use larger diameter single pipe or Pipe-in-Pipe (PIP) SCRs on some fields, where smaller diameter freehanging configurations are at present used. This is because the selection of a simple (freehanging) catenary configuration would have resulted in very high hang-off loads. These would have become even higher in a case of an accidental flooding of the line with seawater that might inadvertently happen during installation or in operation. In such cases using a freehanging catenary might be impossible, because the excessive hang-off load resulting might be too high to handle. Similarly, there might be no installation vessel available anywhere in the world, to handle such a heavy pipe during its installation; or in particular to handle such a large diameter pipe or Pipe-In-Pipe, in a case of an accidental flooding with seawater. The feasible solutions in such cases would be to use wave or 'S' configurations, decrease loads with auxiliary buoyancy, or to use a larger number of smaller diameter lines that are lighter, so that the maximum tension loads can be handled.

To summarize lazy wave, steep wave, pliant wave, lazy and/or steep 'S' configurations according to prior art are used primarily because of two sets of reasons:

In shallow water in order to deal with large horizontal motions of their top supports in waves and/or currents;

In ultra deepwater in order to decrease the maximum (tensile) loads;

An added advantage is some reduction in touch-down or bottom end dynamics.

It is noted, that the average effective tensions at the top of the lower negatively buoyant segments of lazy and steep wave and 'S' configurations may be of similar order of magnitude as those at the line hang-offs. It is also noted, that for the same reasons using modified wave or/and 'S' configurations featuring more than one buoyant segment (buoy) are known. In such cases the subdivisions of the negatively buoyant segments of the catenaries is in known designs in segments featuring comparable lengths and comparable maximum tension loads resulting from similar design philosophy as that used for the design of the single wave and/or 'S' configurations. This is because of the same reasons of maximizing the flexibility of the line (shallow water) or minimizing the maximum loads (ultra deepwater). However, it is noted that:

The use of the configurations in question, as implemented in prior art, results in the increase of the suspended lengths used (and in the corresponding increase in costs of the installation that adds to the cost of the associated 'additional' hardware used);

The selection of one of these configurations in prior art is because of one of the underlying reasons listed above; in the prior art these line configurations are, not selected because of the said added advantage. The reasons are economical, as specified directly above.

Because of their higher costs, the energy industry tends to avoid using said wave or 'S' configurations in conditions where simple catenaries can be made feasible. However, even for lazy wave, lazy S or compliant wave configurations, where partial dynamic decoupling can occur, Barltrop[1] states that touchdown line movements could also be significant.

[1] Barltrop N. D. P., Floating Structures: a guide for design and analysis, Vol. 2, The Centre for Marine and Petroleum Technology, Publication 101/98, 1998.

Another known way of obtaining a partial reduction in the said line touchdown dynamics is a partial decoupling of motions by using a clump weight low on a catenary. This method tends to be only partially effective, because this makes the catenary above the clump weight steeper and it can result in the heave motions being transferred more easily down to the location of the clump weight. It also increases both the mass and the kinetic energy of the system moving, which would also tend to work in the opposite direction to that, which is desired. However, due to the enhanced dynamic decoupling effect in this solution together with careful tuning of the mass added and of its location to the particular dynamic wave spectra prevailing on a field, a partial improvement can be achieved.

Garret et al (Steel Lazy Wave on a Turret Moored FPSO, DOT 2002 Deep Offshore Technology Conference) depict a 'traditional' Lazy Wave SCR featuring a buoyant segment having a length of approximately 33% of the water depth.

Wu and Huang (The Comparison of Various SCR configurations for Bow Turret Moored FPSOs in West Africa, ISOPE 2007) present calculations for a Lazy Wave SCR utilizing a buoyant segment of approximately 18% of the water depth. They called their configuration Mini Lazy Wave.

Neither of the above two designs have ever been constructed. OTC 20180 co-authored by this inventor mentions Lazy Wave SCRs installed in 2009 offshore Brazil (BC-10 FPSO). The other co-author formally supervised mathematical modeling work demonstrated in OTC 20180 and provided editorial help.

BRIEF SUMMARY OF THE INVENTION

OTC 20180 demonstrates several variations of Short-Lazy-Wave SCR designs according to this invention that feature as examples buoyant segments of the length of approximately 10% of the water depth.

This invention involves an arrangement of dynamics decoupling, damping, buoyancy, mass and added mass modifying devices, including utilizing a single dynamics decoupling, damping, buoyancy, mass and added mass modifying device and also including utilizing a system of multiple said dynamics decoupling, damping, buoyancy, mass and added mass modifying devices and also including utilizing a plurality of said systems of said dynamics decoupling, damping, buoyancy, mass and added mass modifying devices, which affect dynamic motions of a catenary line in offshore engineering; whereas said catenary line is provided with said decoupling, damping, buoyancy, mass and added mass modifying devices fitted on said catenary line along a segment of said catenary line located in the vicinity of the seabed, so that a plurality of said segments of said catenary line located in the vicinity of the seabed, includes at least one segment of a non-negative buoyancy in the vicinity of the seabed, the combined length of which does not exceed 15% of the design water depth.

Undersea dynamic motion of a line, cable, pipe, riser or the like is modified by the attachment of devices which locally change the buoyancy, the submerged weight, modify drag damping of the line at selected segments or/and locations and modify other forces acting on the line.

The size, shape, number and position of the mass/drag-enhancing devices may be varied to optimize the motion suppression effect. In particular, a novel line configuration is described in this specification that optimizes the use of buoyancy (depicted in FIG. 1), submerged weight, mass, added mass and drag in a particularly beneficial way.

The novel line configuration that optimizes the use of distributed submerged weight together with mass, added mass and drag is depicted in FIG. 2.

The said novel configurations depicted in FIGS. 1 and 2 are modifications of a conventional, simple (free hanging) catenary configuration, in particular, they can be used in new systems or they can be retro-fitted on existing flexible, or rigid (steel, titanium, aluminum, etc.) free hanging catenary lines. The said novel line configurations can utilize known types of buoyancy or can utilize novel buoyancy shapes as also introduced in this specification and in the commonly-owned patent application entitled "Dynamic Motion Suppression of Riser, Umbilical and Jumper Lines" filed Apr. 24, 2008, U.S. application Ser. No. 11/813,157, now abandoned. The novel feature of the said configurations is that the location along which the said devices are installed on the lines are located in the areas of relatively low effective tension. This includes the said installation locations lying on the said lines in the vicinity of the seabed.

It is noted, in particular, that the novel configurations depicted in FIGS. 1 and 2 have been obtained by modifying simple, free-hanging catenary line designs, without adding any line lengths in comparison with those of the original simple catenaries. These were done so in order to demonstrate the suitability of this novel design to be used for retrofitting existing free hanging catenaries. Using the line length equal (or nearly equal) to that of a free hanging catenary is not, however, necessary to the practice of this invention.

However, the average effective tensions at the top of the line segments between the distributed buoyancy in FIG. 1 (5) or distributed submerged weight in FIG. 2 (5) in these novel designs are significantly lower than those at the line hang-offs.

Many implementations of the said novel buoyancy and weight clamp shapes according to this invention are also good Vortex Induced Vibration (VIV) suppressors. Accordingly, in addition to and instead of the use as wave dynamic suppressors they can also be used as primary or/and exclusive VIV suppressors.

BRIEF DESCRIPTION OF THE SEVERAL VIEWS OF THE DRAWING(S)

FIG. 1 is an illustration of a catenary line (3) suspended from a bow turret (2) of an FPS or FPSO vessel (1). FIG. 1 depicts also a line clamp of a known design (6-0) and eleven example implementations of optional motion suppression devices 6a through 6h, 6k through 6m). Some example devices shown (6) feature a positive overall line buoyancy along the segment, where they are installed. The function of the catenary line shown is immaterial. It can feature an SCR, a flexible riser, an umbilical, a cable, a hose, a bundle of several similar or different lines, etc.

FIG. 2 depicts a catenary line (3a) suspended from a semisubmersible platform (1a). FIG. 2 depicts also a line clamp of a known design (6-0) and eleven example implementations of optional motion suppression devices (6b) through (6l). The example devices shown (6) feature a neutral or negative overall line buoyancy along the segment, where they are installed. The function of the catenary line shown is immaterial. It can feature a Steel Catenary Riser (SCR), a flexible riser, an umbilical, a cable, a hose, a bundle of several similar or different lines, etc.

Optionally, the configurations shown in FIG. 1 and or FIG. 2 can also feature devices type (6-b) through (6-l) mounted in the touch down region (7). The said optionally mounted devices in regions (7) could optionally stretch beyond the touch down points, where they would be in contact with the seabed, see FIGS. 1 and 2. The said optional devices installed like those shown in regions (7) of FIGS. 1 and 2 could be installed on any line configuration in order to mitigate the said line dynamics in the touch down regions, including those installations where the elastic behavior of the seabed is relevant to the design.

DETAILED DESCRIPTION OF THE INVENTION

Figure 1:
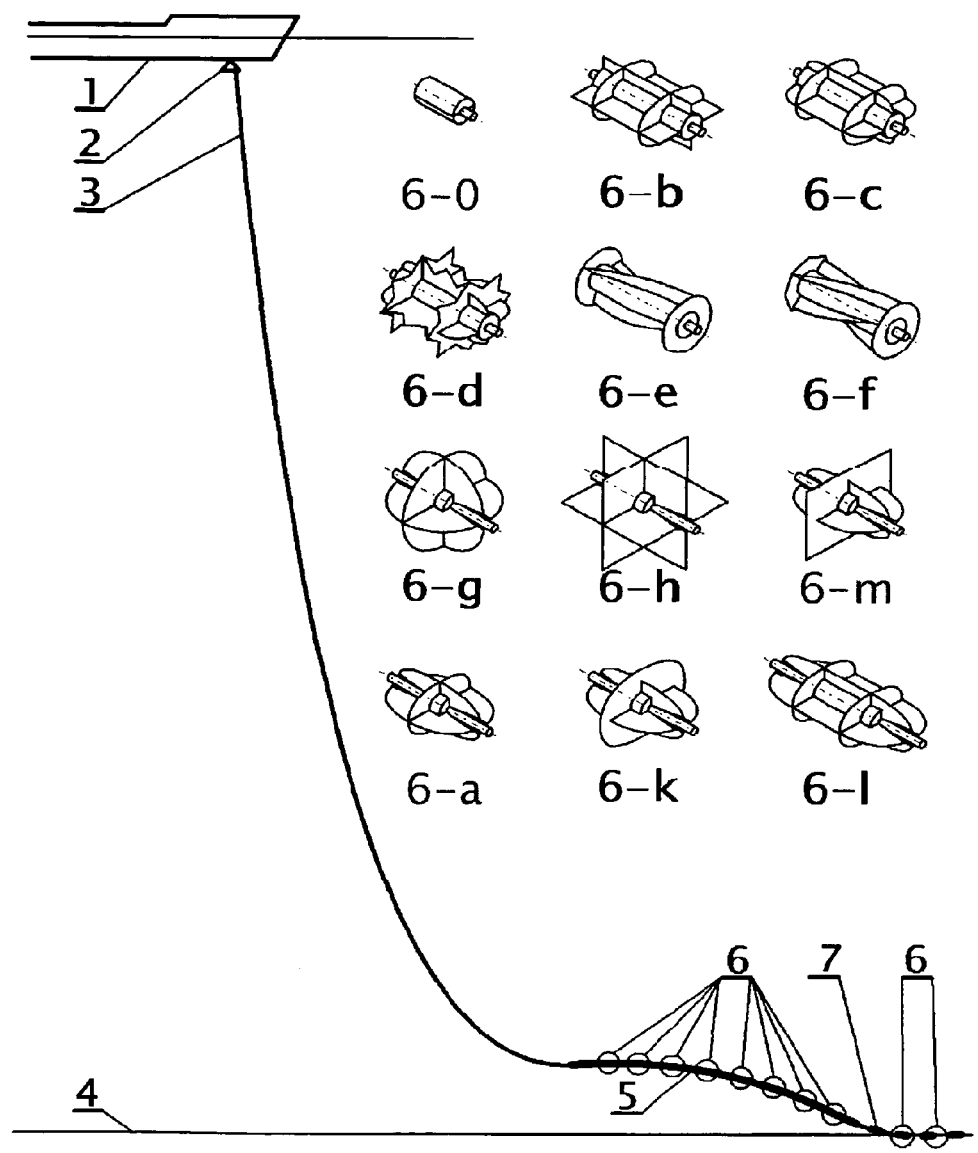

This invention allows the designer to locally fine tune several physical properties of lines, so that the desired motion suppression effect is achieved. The key line physical properties involved are the following:

Mass per unit length,
Added mass per unit length (described in terms of the added mass coefficient),
Submerged weight and buoyancy per unit length,
Drag coefficient.

The above combined properties of the line, on which known or/and novel devices are mounted combined with the properties of the said devices are of importance herein.

The above properties affect the statics and dynamics of said lines in complex ways that have been outlined with regard to the prior art pertaining to the use of clump weights and buoyancy. This invention extends the tools available to the designer by allowing more control over the remaining physical properties of said line, as well as more flexibility in shifting between the added and the actual mass per unit length as well as more flexibility in utilizing the weight, the submerged weight and the buoyancy per unit length of the line.

In addition to extending the design tools, as already noted, this invention provides the designer with more opportunity to fine tune the design involving the said lines in offshore engineering.

The following general observation with regard to the properties utilized according to this invention are noted:

The effects of the submerged weight and the buoyancy are static.
The effect of the drag is static, quasistatic and dynamic.
The effects of the added mass and the mass are dynamic.

It is contemplated that the dynamic interactions involving a motion suppressor according to the invention of a 3-dimensional damper, take place simultaneously in all three dimensions (and arguably in all six dimensions including rotations that are also relevant to some extent) between the line and the surrounding water, as well as due to the transfer of momentum and energy along the line, in complicated ways. These involve propagation of various kinds of the said waves, and their partial reflections at the ends, at locations along the said lines as well as in interactions with the bodies interacting, like the seabed, structures attached and the water surrounding. The said waves are propagated along the lines in ways that can be partly approximated as one dimensional—predominantly along the lines, but there are also important two dimensional effects that happen independently in the IP and OOP directions, wherever the line direction changes.

This invention utilizes the said four line properties as they simultaneously affect said complex six, three, two and one dimensional processes that are mostly dynamic and quasistatic. As the result of utilizing the invention static, quasistatic and dynamic results are achieved, the primary objective being dynamic motion suppression.

The said dynamic motion suppression has the combined, purpose as follows;

The reduction in the dynamic component of the effective tension,
The increase in the lowest values of effective tension anywhere along the line,
The reduction to line susceptibility to global and local buckling, including buckling resulting from local interactions of different layers, components of layers involving the line construction, if applicable,
The increase in the minimum dynamic radius of curvature anywhere along the said line,
The reduction of the fatigue damage and associated increase in the fatigue life of any line components, including those of the internal line construction, if applicable,
The reduction in the range of variable stress components in the said line, including stress components in different line construction components, made of similar or largely differing materials, if applicable,
The reduction in the line susceptibility to bird-caging.

For the purpose of this invention dynamic line excitations can be divided into two categories:

Approximately periodic that can be well approximated with regular, i.e. close to sinusoidal excitations, typically in one to six degrees of freedom;
Transient Excitations, also typically in one to six degrees of freedom.

Regular excitations of very long and/or highly damped lines, whenever standing wave patterns are not generated, are considered as transient excitations for the purpose of this specification.

Real line excitations in offshore conditions typically combine both the said excitation categories. The said combination is typically non-linear and accordingly the load superposition does not apply in general, however, in many practical load scenarios it can be useful to consider a linear approximation of the dynamic system considered, which is a simplification of the real line and its dynamic loading.

Unless the line is very long or damping is very high, the said periodic excitations often generate standing wave patterns on said lines. A linear approximation of the standing wave component of the loading of a line allows the designer to use the following simple guidelines in dealing with the said standing wave loading of the said line:

Maximize drag per unit length along the line segment where the said devices are installed;

Minimize the combined mass and added mass per unit length along the line segment where the said devices are installed;

Depending on whether the design objective is to reduce line dynamic motions within line regions where the said devices are or are not installed:

Minimize the combined mass and added mass per unit length along the line segment where the said devices are installed, in cases where the objective is to reduce the line dynamic motions along the bare line segments;

Maximize the combined distributed mass and added mass per unit length locally, along the line segments, where the said devices are installed, in cases where the objective is to reduce the line dynamic motions of the said line segments where the devices are installed.

If feasible, optional tapering of combined line properties should be considered whenever they change; these include in particular combined bending stiffness of the line and devices added (i.e. use of bending restrictors and/or bending stiffeners, and/or stress joints and/or tapered or stepped transition joints). Optionally, tapering other properties like the submerged weight, buoyancy, drag, mass and added mass might also be worth considering. Varying any properties can be achieved in particular by varying the number of devices used per unit line length and/or by modifying physical properties of the said devices.

In general, for any type of transient or standing wave propagated optional dampers rely as line motion suppressors principally on hydrodynamic damping, while utilizing the drag forces.

Also in general it is advantageous to minimize the combined mass and added mass of the line where dampers are installed.

In addition to the characteristics of being susceptible to configuration changes between that of a free hanging catenary and that of a Short-Lazy-Wave (SLW), which can be done by adding or removing short buoyant segments along the catenary, Note OTC 20180 co-authored by this inventor for some examples of SLWs. SLWs have another feature that makes them different from conventional lazy waves. Because of the reversibility between the SLW and free hanging catenary configurations, the SLWs can be for practical purposes regarded as newly invented desirable design modifications of the free hanging catenary. On the other hand design consideration whether or not to use a more conventional lazy wave involve much greater design and cost related considerations.

In particular, conventional lazy wave risers in ultra deepwater, can undergo very large shape changes whenever the design product is replaced with seawater or a gas, including air. Those can result in very large submerged weight changes, to which long buoyant segments of conventional risers react by sinking considerably deeper or floating considerably upwards in the water column in comparison with their design configurations. Those are disadvantages of a conventional (long) lazy wave configuration well known to those skilled in the art. SLWs do not share those disadvantages with other lazy wave lines or with mini lazy waves that both are characterized with longer relative length of the buoyant segments. SWLs are defined herein as those lines that have continuously distributed buoyant segment, including a grouping of closely spaced discrete floats that is not longer than 15% of the design water depth at the design floater location. Having said that, considerable advantages also characterize other SLW lines, in particular those equal to or shorter than 15% of said water depth, 14%, 12.5%, 12%, 10%, 9% and/or even 8% and less of the design water depth. In particular OTC 20180 discusses as unoptimized examples several SLWs that share buoyant segment lengths of approximately 10% of the water depth.

An additional characteristics of SLWs in comparison with longer lazy waves known is that SLW may utilize buoyancy that is relatively more buoyant per unit length than that used by traditional SLWs, which would result with smaller radii of curvatures of the line along the buoyant segments. SLWs may utilize for that purpose installation curvatures induced on the line during S-Lay or Reel-Lay installations that can be deliberately 'frozen' along the line in order to provide an upwards directed design pre-bent to the buoyant segment. That constant or average induced pre-bent radius may be pre-selected as a deliberate action by preselecting the stinger curvature or/and by adjusting the exit slope of stinger when the buoyant segment is installed. In cases of other types of installation higher design pre-bent curvature can be induced by deliberately offsetting say a J-Lay installation vessel in order to induce said controlled pre-bent in the line. Desired line pre-bent can be also induced by other means, like decreasing the degree of line straightening after said line pipe leaves a storage reel or by deliberately inducing a pre-bent in a J-Lay tower. Any of the above methods or other methods feasible can be utilized in order to provide the desirable curvature in particular to the buoyant segment, so that quasi-static bending loads are minimized in operational (and/or extreme weather) design conditions of the line.

Depending on the buoyancy per unit length to be used together with the water depth, strength diameter, wall thickness of the line, the target pre-bent curvature to be used on the SLW buoyant segment, etc., catenary support can be utilized during the installation of the line, in order to prevent excessive straightening of the line because of its submerged weight and possibly other secondary factors that may prevail during the installation. The said catenary support means may include a use of any combination of auxiliary lines that partly or wholly unload the pre-bent segment, temporary buoyancy, etc., and reduce momentary high bending loads, Auxiliary lines can be rigged from the installation vessel or/and other vessels, for that purpose. The said auxiliary line or lines can be attached to the line installed below the buoyant segment, loads can be transferred between various handling lines, etc., whatever is required by the installation operation used and the design objectives. In parallel with the said auxiliary support means, an adjustment may be made to the inclination angle of any the Reel-Lay, the i-Lay installation tower or ramp, and or any stinger or ramp used in the installation process, including those mentioned above, including S-Lay and/or any other kind of installation. The lines may include those used for Abandonment and Recovery (A&R) on the installation vessel and on other, auxiliary vessel(s), 'davit-like' support with multiple lines, any other type of wires, ropes, cables, flexible lines, temporary 'chord-lines' rigged between selected locations on the line installed, etc. The said auxiliary support means and/or installation angle adjustments would typically be used during the lowering of the pre-bent buoyant segment through the upper and mid-depths in the water column. The need for application of those means, if any, would typically decrease gradually while the pre-bent approaches its final design location on the catenary line being installed.

In all the cases it is recommended that the line cross-section, and in particular riser pipe cross-section is compact and that the usual pipe cross-section stability checks be performed. That should include investigating the combined effect of external hydrostatic pressure, bending, and compression, whichever may be applicable for any design loadcases of the pipe throughout its design life.

In addition to being able to use more buoyant buoyancy segments the advantage of the pre-bending is that static bending stresses in the pre-bent can be counted as zero, thus higher upwards bending dynamic stresses would be acceptable in extreme seastates (configuration with a shape displacement controlled by the catenary equations). Pre-bending would effectively shift the zero stress level from which the bending stresses are computed, whereas the bending stress would be computed from the pre-bent approximate static equilibrium shape regarded as the zero bending stress, and not from the straight pipe. The above is acceptable according to engineering codes, because the stresses in question are secondary stresses.

Additionally, the practical utilization of the variation in the sum of the hardware and added masses along the line is in providing more locations where the line mass changes and thus to induce internal wave reflections. In that wave the travelling wave are split into more 'components' that propagate with reduced amplitudes along longer paths along the line and thus enhance hydrodynamic damping of said wave motions along the line. Those mechanisms can be thus utilized for 'fine tuning' of the line dynamics, in order to reduce its motions, in particular the TDZ motions.

In particular, with the partial damper coverage more internal reflection points are created, which can be used as one of design tools to maximize the damping of the line.

The use of partial damper coverage is also recommended to reduce axial line dynamics whenever the top floater motions are large, like for example those of FPSs and FPSOs in very high seatates. Both, this benefit and the benefit of generating more internal wave reflections on the line can be combined in the line design.

In all the said cases, the designer needs to consider in detail the particular dynamic and hydrodynamic characteristics of the line being designed, the dynamics of any structures or other bodies relevant as well as the character of loading and the way it is propagated along the line. In particular, the line drag, mass and/or added mass per unit length can be utilized to suppress motions, as already outlined. Tapering properties of the said line can be also utilized and in general case the design needs to be evaluated and optimized using mathematical modeling. Commercially available line modeling programs are very useful for this purpose and they allow modeling both the standing wave and the transient load components.

The design evaluations and/or optimizations generally involve a number of design load scenarios (or loadcases) and the design and/or optimizations are performed in an iterative process (essentially by trial and error) until the design objectives are achieved or until the optimal system configuration is found.

Referring now to FIGS. 1 through 5, a variety of damper devices are illustrated. The use of damper devices is optional, as far as this invention is concerned. Damper examples are shown in a close-up on FIG. 5. Dampers (503) are mounted on, rigid (steel, etc.), flexible and tensioned risers, umbilicals, cables, tendons or the like (hereinafter "line" (501)) The devices shown are used for tuning locally the overall line submerged weight (including the buoyancy), mass per unit length, added mass per unit length, drag and bending stiffness of an associated line segment.

FIGS. 1 (6-0) and 2 (6-0) depict motion suppression devices of a known design that are installed concentrically on lines 3. The devices shown are effectively mechanical clamps attached to the lines using any known means, (utilizing bolts (505), tape straps (507), adhesives, welded in place, etc.). Motion suppression devices of known design may feature a large variety of shapes and mounting arrangements, the split-cylindrical one shown for example is the most common one.

FIGS. 1 (6a) through (6h)', (6k), (6l) and (6l) and 2 (6b) through 4 (6l) depict example embodiments of dampers according to an invention that was previously applied for in parallel, see patent application Ser. No. 11/813,157, now abandoned. Attached to the exterior surface of the clamps are external plates The said plates act to increase the overall added mass and hydrodynamic drag of the devices to which they are attached, and accordingly they increase locally the added mass per unit length of the line, and they also increase locally the selected drag force components per unit length of the line, including all drag force components.

The size and shape of the novel damper devices are designed to increase the hydrodynamic drag on the line to the arbitrary level required by the designer. The increase in the added mass that also takes place is because of the dynamic pressure distribution on all external surfaces (including the plates) of the device, whenever the motion of line and the device changes relative the surrounding fluid (relative acceleration). This manifests itself as if an additional mass of water were entrapped, and moved together with the line and the device. The actual mass, weight, submerged weight and buoyancy of the device the plates included, also contributes locally to the actual mass, weight, submerged weight and buoyancy per unit length of the line.

It is noted that the example embodiments of the novel devices depicted on the said FIGS. 1 (6a) through (6h), (6k) through (6m) and 2 (6b) through 4 (6l) are examples only that illustrate the novel design principle involved. The novelty involved is functional and the actual number of realizations possible is much greater than it is practical to depict on drawings in this specification. However, selected design options and design features are discussed briefly further in this specification.

Thus, optional devices may be provided for a riser, umbilical, jumper, cable and hose motion suppressing arrangement for use primarily but not exclusively in deepwater. That pertains to lines including flexible risers, umbilical lines and cables including any combination of electrical lines, hydraulic lines, pneumatic lines, fiber-optic lines, telecommunication lines, acoustic: lines and any other kind of lines that are used in offshore technology. That also pertains to hose lines, jumper lines, Steel Catenary Risers (SCRs), tensioned risers, including freestanding tensioned risers and hybrid riser towers. Providing the said optional devices also pertains to mooring lines, hybrid risers and umbilical lines that might include any combinations of flexible and rigid (steel, titanium, aluminum and any other metal) lines, including tendons, and tethers. Mooring lines in question can include any combination of chains, metal wire ropes, metal wire-synthetic ropes, synthetic ropes and any other materials that can be used for mooring. All said lines and other similar lines that are used in the offshore technology are referred herein as lines, which for the purpose of this specification include all types of lines identified herein and all types of bundles of lines, including riser bundles and pipeline bundles in operation, during their transport and installations. These also include any configurations of the said lines used offshore, inshore and in inland waters. High curvatures of said lines on some configurations, together with their low slopes may be utilized, see simple catenary line, FIG. 1. The original line configuration may or may not be modified. Known motion suppressing device designs can be used, see FIGS. 1 (6-0) and 2 (6-0). Because of the low slope on some configurations (line parallel or nearly parallel to the seabed), said motion suppressing devices can be installed on arbitrarily long line segments, which can be designed as long as necessary in order to achieve the design objections required. Optional novel, drag and added mass enhancing devices (also referred to herein as dampers), see FIGS. 1 (6a) through (6h), (6k), (6l) and (6m) and 2 (6b) through 4 (6l), effective in all directions can be used to increase the suppression effectiveness and/or in order to reduce the number of devices used or to reduce the lengths of the motion suppressing segments.

This invention is suitable for use on new designs and it is also suitable for retrofitting on existing, already installed lines.

This invention is illustrated further below in examples of use of the optional device for a motion suppression of simple (free hanging) catenary configurations of risers, cables or umbilical lines, see FIGS. 1 and 2. Similar devices would also be effective while used in various locations of other configurations on other types of lines, in particular on lazy wave, pliant wave, and/or steep wave configurations as described for example by Barltrop[1].

[1] Barltrop N. D. P., Floating Structures: a guide for design and analysis, Vol. 2, The Centre for Marine and Petroleum Technology, Publication 101/98, 1998.

Two similar example implementations, shown in FIG. 1, of this invention are illustrated herein. A similar implementation of this invention using motion suppressing devices according to this invention having positive submerged weights is shown in FIG. 2. These examples are used herein to demonstrate this invention and to highlight the design reasoning involved. All three examples described herein involve optimizations of this invention for modifications of the simple catenary line configurations according to this invention. Simple catenary configurations are those that experience dynamic touch-down conditions that are the most difficult to deal with, at least in deepwater.

The original simple catenary line according to a known design and both modified configurations optimized according to this invention used the same flexible line characteristics, including the same submerged weights, the same axial and bending stiffnesses as well as the same outside diameters and allowable minimum radii of curvature in dynamic conditions. All these parameters typically vary in wide ranges depending on particular design objectives required. Similar results to those demonstrated by mathematical modeling of the known design, and the new designs according to this invention can be obtained for other lines characterized by other sets of design parameters. In particular, the two examples of the designs according to this invention used herein for the sake of a demonstration depicted in FIG. 1, were very similar, they had exactly the same quasi-static real catenary configurations of a riser or an umbilical, which are depicted in FIG. 1. In order to demonstrate, however the design advantages of this invention that occur even with widely varying technical characteristics, the drag coefficients and the inertia coefficients of the short, close to slightly positively buoyant segments (5) added to the catenary close to the touch-down differed considerably.

For the sake of the said examples the top ends of the line (3) were attached to a bow turret (2) of a floating tanker vessel (1). The seabed (4) was assumed to be horizontal. For the sake of the examples depicted in FIG. 1, a distributed, slightly positively line segment (5) was utilized as an implementation of the invented arrangement in order to suppress line dynamics in the touchdown zone.

Several examples of use of optional dampers are provided by this inventor in OTC 20180.

It is noted, that the devices designed according to this invention added to suppress motions could be positively buoyant (see FIG. 1), neutrally and negatively buoyant (see FIG. 2), could be distributed and could be placed in discrete locations, depending on the design objectives of the designer, including but not being limited to the degree of modification of the variations of average components and to the extents of variations in the dynamic components of technical parameters, for example the said effective tension and for example the said minimum radius of curvature. The devices of the conventional shape installed on the lines should preferably be located within the lower ⅜ of the line suspended length, but they can be installed as low on the lower 35%, ⅓, 30%, 27.5%, ¼, 22.5%, 20%, 17.5%, 15% or even ⅛-th of the line suspended length from the location of the touch down or from the location where the line is connected to its upper end attachment. The conventional or/and drag enhanced floats in the SLW configuration should be installed along a line segment of the length that does not exceed 15% of said water depth, approximately 12.5%, 12%, 10%, 7.5% of WD or even less of WD and shorter buoyant segments are also included.

In particular examples of SLWs provided by this inventor in OTC 20180 feature for example only buoyant segments of the lengths of approximately 10% of the water depth and but buoyant segments according to this invention that are both longer and shorter can be used.

Novel shape dampers may be optionally installed anywhere along the line.

Optional dampers can be physically attached to or incorporated in the design of the buoyancy unit, or/and they can be attached to separate clamps clamped to the risers in various interchangeable patterns between the buoys. The novel surfaces can be mounted on the riser while utilizing elastic, hinged, etc. arrangements in order to facilitate installations involving stingers, J-lay towers, divers, Remotely Operated Vehicles (ROVs), etc.

The said original and both the said modified catenary configurations in the examples shown on FIG. 1 use the same top of the line departure angles from the horizontal. While one uses the catenary line approximation of a real line shape, it is noted that for a given water depth, with a given top line support elevation and a given average slope angle of the seabed the IP shape of an ideal catenary line is uniquely defined and it is described with an algebraic mathematical equation involving a hyperbolic function cos h. Accordingly, the top departure angle is a convenient parameter to describe shapes of real lines used offshore.

It is also noted that said top catenary angles used in offshore engineering vary in a wide range, depending on the water depth and sets of other parameters that depend on particular design objectives, types of the surface structures used and their motion characteristics, if relevant, types of lines used, configurations of other, neighboring lines that need to be cleared, etc. In particular, on the high side it is common to use in deepwater, umbilical line nominal departure angles of close to 88° and to 89° from the horizontal, and both values up to 90° and much lower values are assumed by line catenaries used on several Gulf of Mexico Truss-SPAR platforms due to low and high frequency motions as well as due to shifting the platform mean location between various design parking positions. On the lower side it is mentioned that for example SCRs in not very deep water can use top departure angles lower than 65° or even lower than 55° and many mooring lines used have nominal top departure angles close to 45° and lower in deep water, and even considerably lower in less deep water. This invention can be used with many types of lines in many configurations having any top departure angle selected from a wide range by a designer.

A design optimization process that extends beyond usual known design considerations combined with providing adequate, novel means to achieve the design level of motion suppression in key design areas of lines used in offshore engineering. In order to achieve a desired level of motion suppression according to this invention, drag damping and added mass may be optionally utilized. For the examples of the simple (free hanging) catenary lines demonstrated herein (FIGS. 1 and 2), the key regions of interest are the touchdown zones. The said properties of catenary lines that were already highlighted herein are utilized in a novel way according to this invention in order to achieve the design objectives required.

In particular, it is desirable to utilize drag and added mass along a line to an extent required. Near the touch down area, a simple catenary has its maximum design curvature. This makes the selection of the area adjacent to the touch down particularly effective in the maximizing of the motion decoupling process. In particular, using buoyancy or/and approximately neutrally buoyant drag and added mass enhancing devices in the SLW configuration according to this invention directly adjacent to the touch-down area are particularly advantageous novel ways in achieving motion suppression. That is more effective than using say a traditional "longer" lazy wave configuration just in order to deal with the touch-down dynamics, when there is no other, governing reason for selecting a lazy or pliant wave or a lazy S configuration.

In particular, it is noted, that in the touch-down area, the catenary line has naturally a small slope angle, in addition to the large curvature that is utilized to enhance decoupling. Clamping buoyancy on a line increases its drag and its added mass. Accordingly, it is natural to utilize the small slope together with the neutral buoyancy of a line segment that can be extended almost indefinitely to a segment length that is required to achieve the motion suppression desired. In order to compensate for the natural aging of most buoyant materials used, this means in practice a slight overall positive buoyancy of the line segment added. The additional advantage of the slight positive buoyancy is, that if desired so, the slight original downward slope of the catenary in the touch-down zone can be compensated with slight positive buoyancy, so that the average added segment slope can be modified to any desired downward, horizontal or upward value required, so that there is no physical limit to the selection of the length of that novel segment required according to this invention. Mathematical modeling proved, that while using buoyancy elements of known design, FIG. 1 (6-0), which are featured with traditional values of the drag and inertia coefficients, effective tension compression (i.e. negative values of the effective tension) was removed for the line example depicted in FIG. 1, in spite of extreme seastate conditions used. Neither of the above was achievable while using the known simple catenary configuration for the tanker vessel motions and the typical line characteristics used. In addition to this, the minimum values of the radius of curvature were increased to those considerably above the allowable value. It is understood here that the inertia coefficient incorporates the added mass coefficient and also accounts for the Froude-Krilov forces on a body considered.

It is noted, however, that for the configuration, according to this invention depicted in FIG. 1, but utilizing buoyancy clamps of known design, FIG. 1 (6-0), significant tensile (positive) dynamic components were present in the values of the effective tension and in the values of the radius of curvature. It is also noted, that in a similar modeling exercise with a short buoyant segment located slightly higher on the catenary, it was not possible to keep the effective tension positive throughout the modeling time span (irregular sea of predefined duration). However, by utilizing distributed buoyancy according to this invention as shown for example in FIGS. 1 (6a) through (6h), (6k) through (6m), the minimum radius of curvature in the dynamic line motion was increased to an acceptable value, see below.

The second example design according to this invention presented herein utilized drag and added mass modifying devices according to this invention, like those depicted in FIGS. 1 (6a) through (6h) and (6k) through (6m). The shape and the size of these devices can be designed to increase the drag and inertia coefficients considerably, see FIGS. 1 (6a) through (6h) and (6k) through (6m) for some examples. In general, the larger the dimensions of the shapes used, the larger the drag and inertia coefficients will be. These allowed significant improvements in the effectiveness of the drag and added mass suppression. It is noted in particular, that the local discrete or distributed increase in the added mass, could in theory, be as effective in decoupling motions as using a clump weight, however, the added mass of water does not have the undesirable effects of making the catenary steeper and transmitting the heave motions more efficiently to the lower regions of the line Increasing the drag forces locally results in additional damping, i.e. dissipation of the oscillation energy transmitted along the line and stored in the vibrating system.

The use of the enhanced drag and enhanced added mass devices in the second example described herein, like the examples shown in FIGS. 1 (6a) through (6h) and (6k) through (6m), resulted in additional large reductions in the dynamic components of the effective tension and increases in the minimum radii of curvature. In fact, the modeling demonstrated that the length of the modified segment (5), as shown on FIG. 1, could have been reduced considerably in comparison with that used and the improvements achieved would still be considerable. Similar examples involving extensive sets of tabulated and plotted results are demonstrated in OTC 20180.

Several examples of the drag coefficient and the inertia coefficient-enhancing shapes are depicted in FIGS. 1 through 4, but many more are possible and can be used in implementing this invention. There are so many configuration selection possibilities that it would not have been practically possible to demonstrate them all on drawings or to fully describe all the possibilities. Accordingly, a general description follows that highlights the outline of the possibilities existing. In particular any combinations of triangles, squares, rectangles, other polygons like that shown for example in FIG. 1 (6f), circles, ellipses, ovals, star-like shapes and many others in absolutely arbitrary combinations can be used. All the above outlined shapes are expected to perform well in the motion suppression.

The use of dampers is particularly effective when combined with the SLW configurations.

The design arrangement according to this invention of the shapes used for the drag and added mass enhancements is important. Because said line motions in the touch down regions are three dimensional, or to be more precise five dimensional if one adds rotations IP and OOP, the shapes used according to this invention provide the drag and added mass enhancements that are simultaneously effective in more than one direction and preferably in any three directions, that would be affected approximately similarly to three mutually perpendicular directions. In particular, the drag and added mass enhancements according to this invention are recommended to be effective in the axial direction and simultaneously in both IP and OOP directions of the catenary. However, any other selection of directions can be used if that selection has a similar effect. Numerical modeling shows that drag enhancing only in the axial direction, for example that suggested by U.S. Pat. No. 4,909,327, enhancing drag in the axial direction of a line is not very effective.

The areas and the aspect ratios of said devices that enhance the drag and added mass in differing directions need not be the same, in fact in the general case they would be different, see FIGS. 1 through 4. The aspect ratio is defined herein as the square of its maximum dimension presented to the flow divided by the surface area of a given shape presented to the flow along the mean normal vector to the surface of the shape (this is equal to the ratio of the effective span length of the shape to its mean chord length). For instance, for a square and a rectangle the said maximum dimensions are the lengths of their diagonals, for a circle it is its diameter, for an ellipse it is its long axis, etc. Thus for example, the aspect ratio of a circle is $4/\pi$ that approximately equals 1.273 and that for a square is equal to 2.0.

It is obvious to anybody skilled in the field of fluid mechanics that the shaped appendages utilized by this invention develop high drag forces due to their large angles of attack (preferably completely or almost completely stalled relative flows) in the relative motions of the line with regard to the local relative surrounding fluid (seawater) velocities. Those large angles of attack correspond to approximately small angles between the normals to the shapes and the acting lines of the relative velocity vectors. Plan shapes and aspect ratios of said shaped surfaces affect the drag forces generated, elliptical and circular plan shapes tend to be more effective.

For dampening out transverse component motions of the line, i.e. those in the lateral direction, low aspect ratios may be also more technological, however for those motion components the above given definition of the aspect ratio (which is the general definition used in fluid mechanics) should be modified in the way that the laterally effective span length should be the greatest dimension across the said shape, that can be measured along any direction perpendicular to the line axis.

For shapes dampening motions predominantly in the direction tangential to the line axis, the general aspect ratio definition need not be modified.

However, as far as the plan shapes are concerned the most important quantity is their aspect ratio, and all the planar or curved shapes suggested, including those shown by example on FIGS. 1 through 5 share the characteristics of having low aspect ratios. In particular order to be most technological as damper shapes the aspect ratios of the said shapes that dampen motions predominantly along the line (i.e. in the axial or tangential direction) should be preferably not greater than 5.0, while even smaller values of aspect ratios between close to 0.0 and 2.5 being more technologically applicable than the shapes featured with higher aspect ratios.

With regard to the damping efficiency, higher aspect ratios are desirable in order to achieve a greater damping effectiveness, but the increase of the aspect ratios can be less technologically acceptable (possibility of hydrodynamic instabilities, otherwise avoidable local bending or torquing of the line, interaction with other objects like other lines or installation ramp stinger, dual role involving additionally suppressing Vortex Induced Vibrations, etc.)

While selecting a particular shape or shapes for line damper design the engineer should have in mind a purpose of achieving shape damping properties that are approximately symmetrical around the line axis, i.e. being as non-directional as possible. That can be achieved in one of two ways, or by combinations of those ways. The ways in question herein are the following:

Preferably using shapes, whereas the center of effort of the hydrodynamic drag force on the said shape lies close to the axis of the said line;

Combining shapes, whose drag force centers of effort may lie away from the line center, in a regular or random way, so that the said drag forces average out, so that the combined drag force on shapes arranged along a line segment lies close to the line axis.

Using shapes having aspect ratios between 2.0 and 5.0, like for example close to 3.0, close to 4.0, or shapes using aspects ratio greater than 5.0, like for example close to 6.0, close to 7.0, close to 8.0 and even close to or greater than 10 may be effective technologically. Using higher aspect ratios in the above outlined ranges and beyond may be preferable (higher damping), but that may imply hydrodynamic instability problems caused by momentary drifting of the drag center of effort away from the line center and associated problems with undesirable localized bending and/or local twisting of the line.

The above described aspect ratio, plan shape and the location of the center of effort of the drag force for the said shapes are the most important design parameters that govern the hydrodynamic damping effectiveness of said shapes. While preserving similar values of the above listed parameters, multiple variations of the shape outline and/or surface curvature are feasible and those either do not modify shape effectiveness or they may have relatively small effect on that effectiveness. Those do not affect the applicability of the said multiple shape variations for the purpose of this invention and all those shapes characterized by the governing design parameters similar to those specifically listed and/or depicted on FIGS. 1 through 5 herein can be used to build dampers that are effective for the purpose of this invention.

Accordingly, the selection of any particular plan shape used is a design decision of a secondary character that will be affected by materials used and manufacturing technology selected (example molding or cutting from prefabricated plates, etc.). As a somewhat similar example from another field, one can mention theoretically most efficient elliptical plan shape of an airplane wing in subsonic flow. Supermarine Spitfire, one of the most successful World War 2 fighter planes had such an elliptical wing, which was fairly hard to build. By comparison, US P-51 Mustangs or German Messerschmitts utilized trapezoidal wing plan shapes that were aerodynamically almost as efficient, but they were much easier and faster to build, which made them more economical. It was a design engineer decision to select any of the above choices, the overall result in all the above examples were plan shapes of very similar aspect ratios and in cases of the above US and German fighter planes wing shape taper ratios that resulted in the trapezoidal wing lift distributions that well approximated spanwise lift distribution of the ideal elliptical plan shape. The results were similar overall wing performances and all the above mentioned example designs were outstanding, the Spitfire had, however, a tighter turning radius than the Messerschmitt had, which gave the Spitfire Pilots an edge above their enemies.

It is obvious to anybody skilled in the field of fluid mechanics that due to the stalled work mode of the damper shapes, the above mentioned considerations due to the lift force generation on foils (wings included) are partly relevant to the flow circulation and drag force generation on dampers.

The choice of a plan shape of surfaces used for any particular application can be optimized using the results of model tests. That includes decisions whether or not to utilize slots, surface perforations or/and rugged edges, the size of damping surfaces used, their density along the line, partial damper coverage, etc. Slots, perforations and rugged (or jugged) edges increase the turbulence in the wake of the damper and they also decrease the drag force dependency on the Reynolds Number. They thus have a potential of increasing the drag forces (drag coefficients), while reducing the added mass forces (added mass coefficients). It is assumed herein that the drag and added mass coefficients are all related to the same hydrodynamic diameter, for example the fin (or shape) root diameter. Similarly to the above, it is a design engineer decision which options to use, because those selections affect the damper performance versus manufacturing, installation and/or economical considerations.

The sizing and placement of slots, perforations or/and side edge cut-outs could also affect the plan shape selections is the matter of design and technological (including the installation and manufacturing) optimization of a secondary character that are the part of detailed design of dampers.

Typically, the results of model testing will be utilized in mathematical modeling that would also be used in the process of the optimization of the line design. Computational Fluid Dynamics (CFD) can be also utilized in the design pre-screening and/or for design optimization.

Three dimensional arrangements of the drag and added mass enhancing features can be very complex. In particular, in addition to predominantly planar appendage shapes that are shown in FIGS. 1 (6*a*) through (6*h*) and (6*k*) through (6*m*), curved shapes, in general featuring both curvatures and twists can also be used. For example, FIGS. 1 (6*e*) and 1 (6*f*) depict helical strakes. The shapes (509) or (511) can feature smooth (509) or rugged edges, like those shown for example in FIG. 1 (6*d*) and in FIG. 5, (511). Any of the added mass and drag enhancing devices described herein can also feature drag and/or added mass enhancing holes and/or slots that could in some situations be more effective than solid plan shapes, similarly to holes and/or slots that are used in the designs of some parachutes.

The use of the drag and inertia coefficient enhancing shapes provides a designer with several additional design optimization tools according to this invention:

Selecting the actual shapes and the design parameters of the motion suppressing shapes, while having additional design philosophy aspects in mind, for example the OOP shape of the catenary in case of a significant cross-current, VIV suppression, etc;

Selecting the appropriate shape dimensions for the level of suppression required;

Balancing between the effectiveness of the shapes, buoyancy, submerged weight used, the length of the motion suppressing segment and/or the number of said suppressing devices used, etc.

Three important design philosophy aspects might need to be considered in the design of the drag and added mass motion suppressing arrangement according to this invention. They are both related to a particular current profile.

The first one regards the way drag in a current affects the shape of the design catenary;

The second one is related to the way any design modifications according to this invention would affect VIVs of the line, if relevant;

The third is that the drag and added mass enhancing devices described herein can be used anywhere on lines also with the primary purpose of VIV motion suppression.

On most field locations currents tend to decrease with the water depth and they tend to become even weaker near to the seabed. These tend to be beneficial, because local drag increases would tend to result in smaller distortions of the line shape, than those that might occur for example in lazy or pliant wave configurations. However, the above is not always the case. On some location's bottom currents could be particularly strong. In such situations these aspects need to be included in the design process and the locations of the drag and added mass motion suppressing arrangement might need to be moved higher along the catenary. It is noted, however, that this does not necessarily need to be the case, the dissipating effectiveness of hydrodynamic drag using damper improves with increasing current. The effectiveness of the added mass suppressing component in a current might require additional consideration and designer's attention in a case of a current. The actual shapes used for the suppression enhancement might be of importance in this context.

Figure 2:
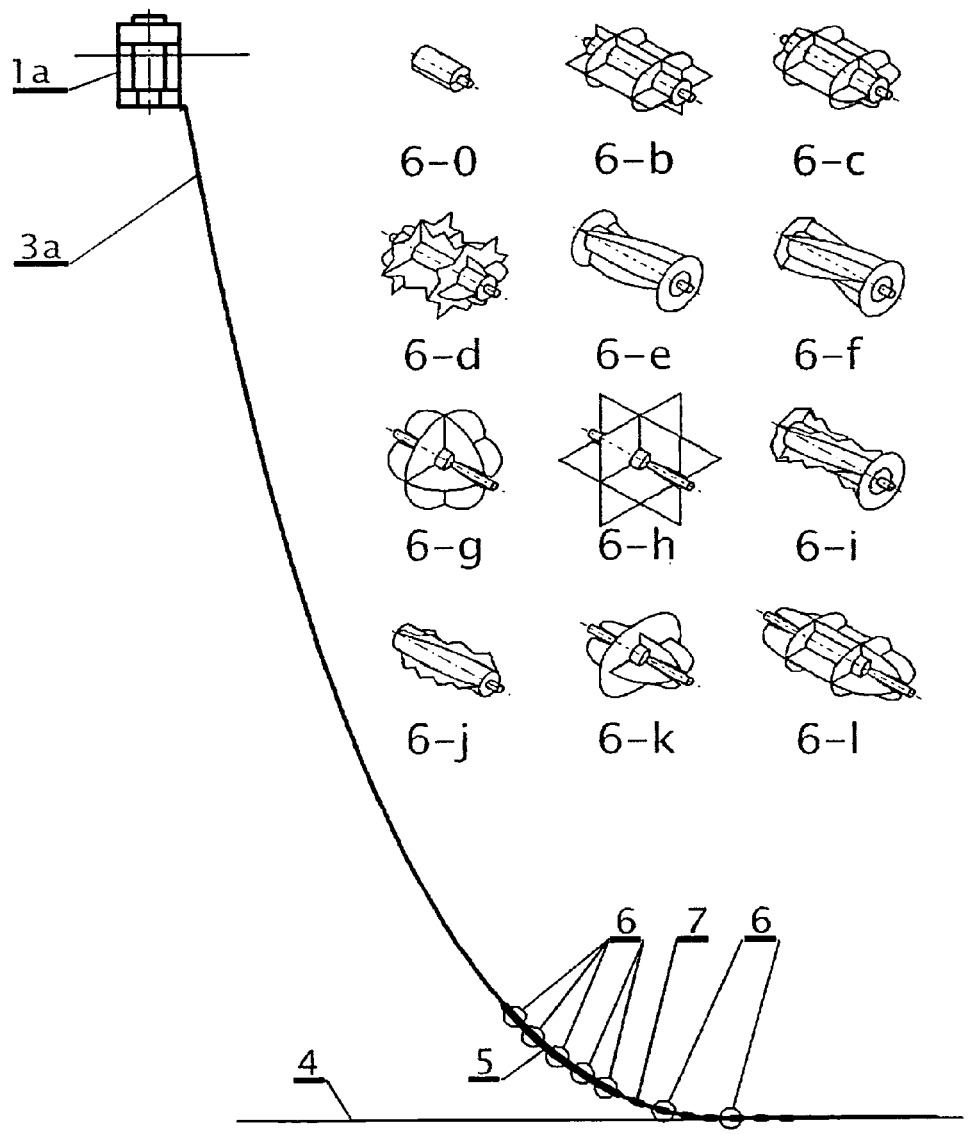
Figure 3:
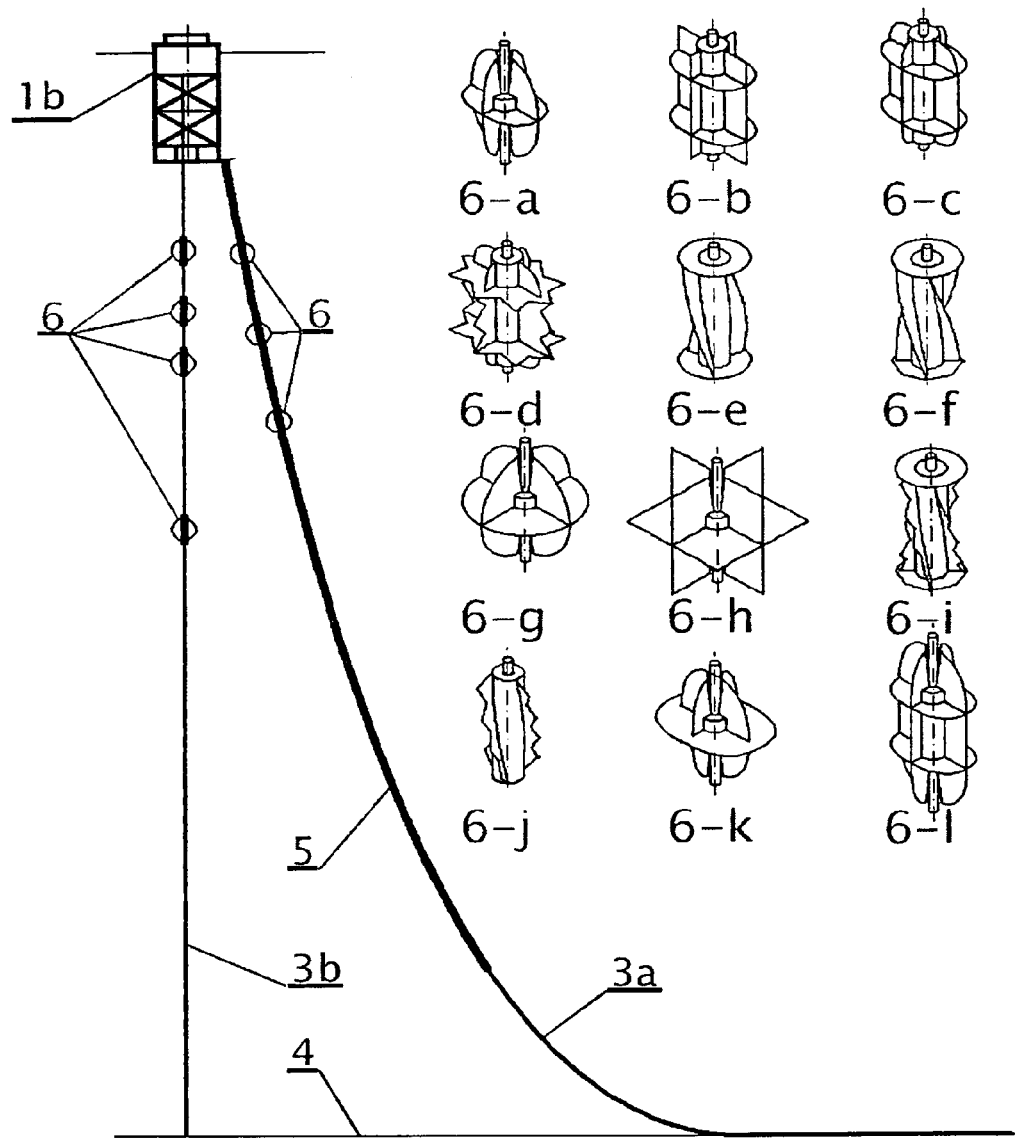
FIG. 3 shows a SPAR platform (1b) having a catenary line (3a) and a tensioned line (3b), both equipped with motion suppression devices (6).
Figure 4:
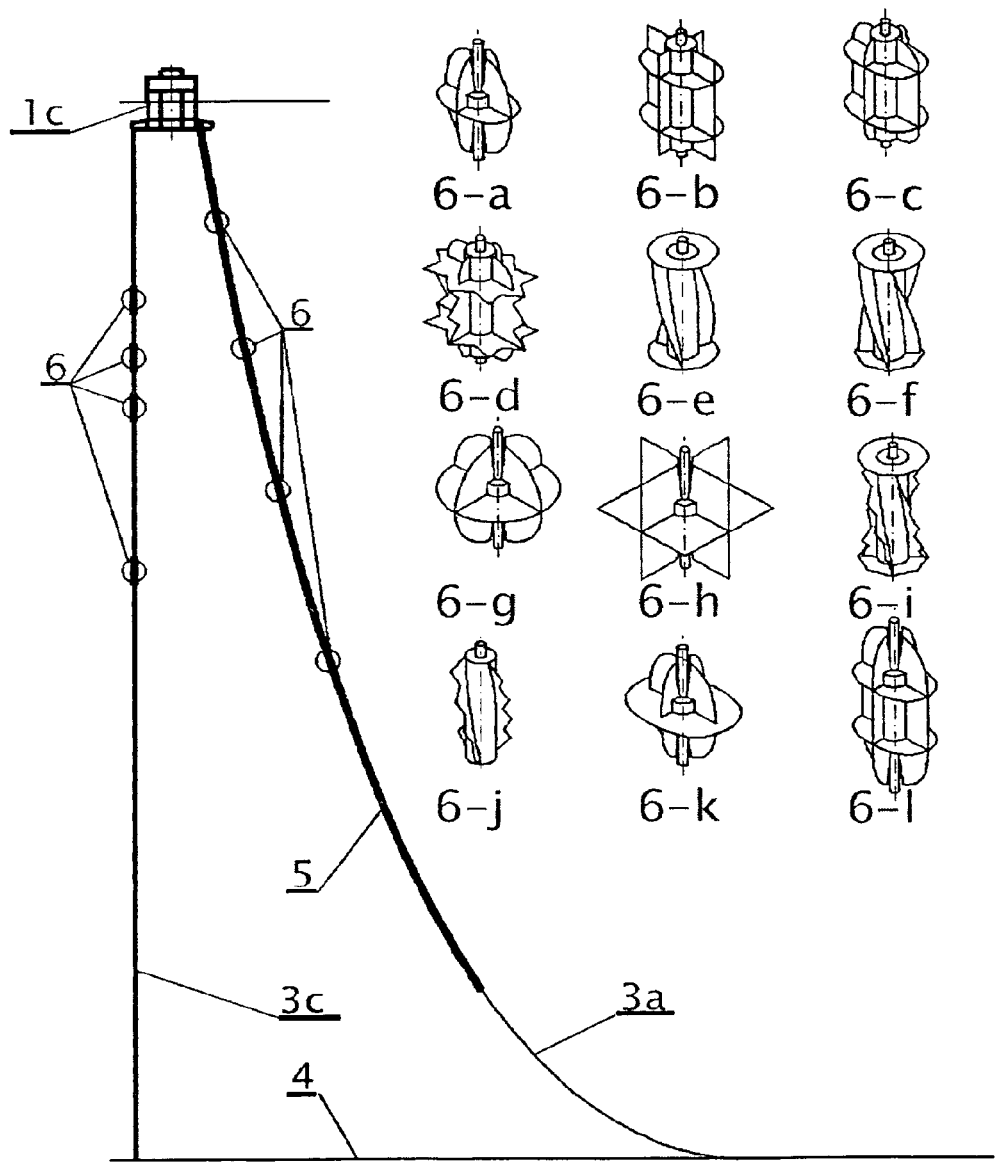
FIG. 4 illustrates a TLP (1c) having optional motion suppression devices (6) on both a catenary line (3a) and on a tendon (3c).
Figure 5:
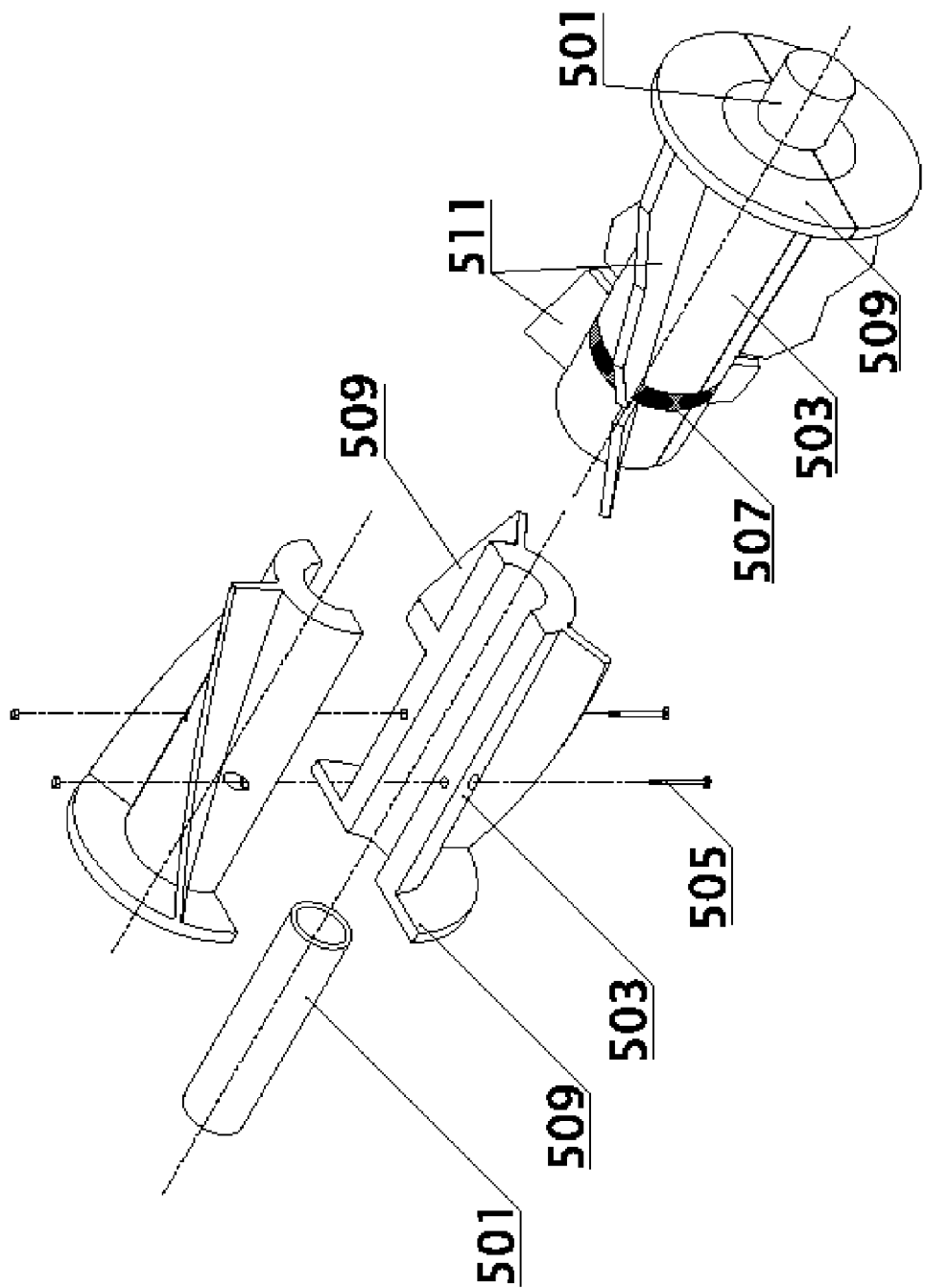
FIG. 5 depicts in larger scale segments of motion suppression devices shown in FIG. 1 (6-e), FIG. 2 (6-e), FIG. 2 (6-i), FIG. 3 (6-e), FIG. 3 (6-i), FIG. 4 (6-e) and FIG. 4 (6-i). All details shown on FIG. 5 are obvious to anybody skilled in the art on the basis of this specification and FIGS. 1 through 4.

With regard to the VIV potential, it is noted that in general both the use of buoyancy of known design (FIGS. 1 (6-0) and 2 (6-0)) and/or that having invented shapes (FIGS. 1 (6*a*) through (6*h*) and (6*k*) through (6*m*) and also FIGS. 2 (6*b*) through 4 (6*l*)) for additional motion suppression will tend to improve the VIV situation, because of the local decrease in the reduced velocity, due to the increase in the hydrodynamic diameter. The additional improving effect of the increase in the hydrodynamic diameter would in most cases be increased drag damping, which would tend to increase the damping of the whole dynamic system. In fact, unless the current is very strong the designer of a system according to this invention has additional tools to reduce the VIV susceptibility of the entire dynamic system. The additional tools involve the freedom to use beneficial hydrodynamic diameter in order to reduce locally the reduced velocity, use of beneficial shape configuration to increase the hydrodynamic damping in the system, as well as shaping the damping appendages so, that additional vortex generation suppression results. The latter could include adding helical pitch to the design of the shapes, see for example FIGS. 1 (6*e*) and 1 (6*f*), in order to provide them with added vortex suppression effectiveness, using rugged edges like those depicted for example in FIGS. 1 (6*d*), etc. The issue of the added mass could be more complicated in case the suppression area increases the VIV energy of the system. In such cases added mass could be even negative and additional, more complex optimization considerations could be necessary. Accordingly, the general guideline is to try to reduce the reduced velocity in the regions designed for the motion suppression and consequently to enhance their effectiveness both in the wave oscillation frequency range and in the VIV frequency range.

It is noted that known strake designs used in order to suppress VIV (like those shown for example in U.S. Pat. Nos. 6,695,540B1 or 6,896,447B1), would in principle have different geometrical features than strakes designed to be used as dampers. Many geometries of VIV suppressing strakes are used in the offshore technology, some had never been model tested before the installation in the ocean. However, those strake designs that are justified by extensive model testing programs and many years of research tend to have strake height to root diameter ratios of the order of 25% or lower. Usually, three strakes are arranged on the circumference. Typical configurations have pitch of the order of 17.5, 17 down to 15 times the root diameter.

However, some European tests recommend strakes of the pitch three to four times smaller. These tend to result in less effective VIV suppression, but the drag of the line tends to be smaller. Generally, VIV designers try to optimize the VIV amplitude reduction effectiveness with minimizing the hydrodynamic drag of the strakes. These objectives are different from those desired herein, and accordingly the designs resulting would preferably differ. In particular, if helical strakes are utilized as dampers, they may be also fitted with axial drag increasing plates, like those depicted for example in FIGS. 1 (6e) and 1 (6f) that are not used on VIV suppressing strakes. In addition to this, it is noted that maximizing the drag would tend to favor higher height-to-root-diameter ratios, providing that is acceptable according to the variety of other design conditions (for example background current profile and strength). In particular, those strakes shown in FIGS. 1 through 4 have the height-to-diameter ratios on the order of 50%, and even higher fins could be used say even as high as 200% of the fin root diameter.

The strake heights and other features would typically be affected also by other considerations like a manufacturing process used, economic considerations, installation configuration limitations, etc. that might tend to reduce the height of the strakes used in any particular design. Also, drag is better enhanced if more than three fins are used on the device circumference, in particular the example depicted in FIG. 1 (6f) uses for sake of instance four fins, while that of FIG. 1 (6e) uses only three fins; using other numbers of fins is also feasible.

It is noted that other damper shapes may also have high VIV suppression effectiveness, in particular the shapes utilizing rugged edges. These shapes can feature rugged contours, with or without helical twist. Rugged contours result in forcing wake vortices to be shed at particular lengths, which can be varied by the designer by selecting irregular ruggedness patterns or/and by mounting devices on lines at irregular intervals.

Arbitrary geometrical shapes can be used in many implementations of this invention. The said shapes can intersect at arbitrary angles, including a wide range of acute angles and right angles. It is understood herein, that any flat or curvilinear surfaces intersecting at other than a right angle will define at least two values of angles, the governing one of which will be an acute angle and the other one being 180° minus the said acute angle.

It is also noted that manufacturing and installation limitations can also limit the size of any shapes used. In general they can have simple construction or they can be strengthened with ribs, they can use fiber reinforcement technology, they can utilize strengthening brace members, etc., none of which are shown for the sake of simplification in FIGS. 1 through 4.

In particular installation or transport requirements would often affect the detailed design of the said novel shapes. In particular, the designer might decide to provide the said devices with additional strengthening, for example additional ribs or braces that would provide additional protection or/and increase the bearing strength of the said devices, with regard to contact with external bodies. This could be demanded by a need to withstand contact loads with other equipment for example with a stinger of an installation vessel, with a ramp, with a J-lay tower components, a contact with a beach during launch, an interaction with the seabed during a bottom tow, in the touch down area, etc.

It is noted that the devices used might use split clamp design (symmetrical, see FIG. 5, or asymmetrical, including designs that are split on one side), the details of which are also omitted for clarity from the isometric views presented in FIGS. 1 (6a) through (6h), (6k), (6l) and (6m) and also FIGS. 2 (6b) through 4 (6l). It is noted that any materials and construction principles used in subsea engineering are suitable for use to design and to build said drag and added mass enhancing devices. Devices of the same and of mixed technical features can be used on the same line, if so required. They can be mixed along the line, or in particular their technical characteristics including the shapes, material densities, drag coefficients and added mass coefficients can be modified gradually along said line or lines in order to achieve any particular design objectives required. Optimizations using mathematical modeling are useful and cost efficient, however, specific model testing programs would be a useful design optimization tool.

It is noted that with some sets of design requirements including the design requirements on the line properties, the met-ocean conditions and the characteristics of the top support structure (i.e. vessel, buoy, etc.), it might be relatively easy to configure the design arrangement according to this invention, so that the dynamic compression is removed or reduced to a desired level. However, particularly in 'more challenging' irregular sea conditions it might be more difficult to optimize the design to limit dynamic bending as well.

In cases where the reduction of the minimum radius of curvature beyond that easily achievable by using the said dynamic decoupling arrangement according to this invention alone is less easy than dealing just with dynamic compression, it might be advisable to use also traditional stress joints (with uniform or varying properties, including tapered and stepped stress joints), bending restrictors or bending stiffeners, etc., as desired, at one or both ends of segments where the added mass and/or drag properties and/or submerged weight (buoyancy included) are modified in order to achieve the decoupling.

Bending stiffeners and/or bending restrictors and/or uniform and/or tapered stress joints can be used with segments having constant or/and variable said modified line properties along the segment length. In particular, tapering of the line properties towards one or both segment end(s) can be utilized. What is meant here, is also using mass, added mass, drag coefficient, submerged weight, buoyancy, etc. that are variable along the line, according to this invention, alone or/and together with traditional means to govern bending, like those provided by traditional stress joints, tapered transition joints, bending stiffeners, bending restrictors, etc. These include combining the said uniform or said variable line properties according to this invention, with those of the said traditional bending control devices. The said combining can be performed so, that:

The said bending control devices can be installed at an end or at both ends of the segment(s) having modified properties, according to this invention;

The said segment(s) having modified properties, according to this invention can be simultaneously featured with modified bending properties, so that they can also perform like a traditional bending restrictor or bending stiffener;

Stress joints and/or stepped and/or tapered transition joints can be used at the locations with modified hydrostatic and/or hydrodynamic line properties according to this invention and/or they can be used at adjacent location or locations.

The physical properties of line appendages, whether of known or novel design are determined in the design process in the usual way using the densities of the materials selected and their dimensions, which result in volumes that can be calculated. The said physical properties include:

mass of the said appendages per unit length of the line,
weight in air of the said appendages per unit length of the line,
buoyancy of the said appendages per unit length of the line,
submerged weight of the said appendages per unit length of the line.

Of course, the said submerged weight is equal to the difference between the weight and the buoyancy.

The added mass per unit length and the drag coefficients of appendages of known design as well as those of some of the isolated shapes added to the appendages of novel design presented herein are known (or in the latter case they could be known approximately) from technical literature, like DNV CN30.5[3]. However, in most cases, the remaining hydrodynamic properties of the said appendages:

[3] Environmental Conditions and Environmental Loads, Det Norske Veritas, Classification Note No. 30.5, DNV CN30.5, March 2000.

the added mass of the said appendages per unit length of the line (the added mass coefficient),
the drag of the said appendages per unit length of the line (the drag coefficient), are determined from hydrodynamic model tests. The hydrodynamic model tests would in many cases include some variations of the geometries of the appendages tested.

Knowing the above properties, the designer refines the design of the dynamic motion suppression of the line using mathematical modeling. This is performed using specialized computer programs (including those commercially available) or equivalent (the 'equivalent' might include customized databases prepared previously using mathematical modeling, etc.). The refining process typically involves parametric studies including the variation of the said line property parameters specific to the specific design criteria of the line until the desired or optimal line suppression design is achieved. The said design criteria of the line would typically include for example: water depth; base line properties and geometry; platform, buoy, etc motions; wave climate, current profile; clashing potential with other lines and equipment; etc.

In order to locally suppress the line dynamics according to these guidelines, the designer may locally maximize the drag along the line. The designer needs to fine tune the design, including optimizing the line mass properties. Important, but often optional, additional design tools are tapering the said line properties, including using bending stiffeners, restrictors, stress and transition joints, etc. as described herein.

In some cases variations of the design process outlined above can be selected instead, while still including in principle the major action components described above. This could include for example refining the said line properties in the preliminary design process and subsequently using hydrodynamic model testing in order to refine the specific said line appendage properties.

Whichever design 'flowchart' is used, the design process typically includes several design iterations. Model testing iterations might also be required; a tendency is to keep a number of these to a minimum.

In addition to the above mentioned, the design iterations typically deal with a number of usual design issues like static and dynamic positive and negative effective tension, allowable bending moments, minimum radius of curvature, maximum dynamic stresses, fatigue, as already described herein, etc.

What is can be optionally provided are damper devices installed on lines used in offshore engineering featuring three-dimensionally arranged shapes designed to enhance hydraulic drag; said hydraulic drag used to gradually dampen-out dynamic transverse component motions and dynamic axial component motions propagated along said lines by having the normals to said shapes directed approximately along the directions of relevant components of relative velocity vectors between the motions of the line and that of the surrounding seawater; said lines including steel catenary risers, flexible risers, umbilicals, cables, tethers, tendons, hoses, jumpers, tensioned risers including free standing risers, hybrid riser towers, rigid risers made of steel and including rigid risers made of other materials, including titanium, including aluminum and including fiber reinforced plastics; said damper devices modifying also other static and dynamic forces on the lines including combinations of said drag forces with inertia, buoyancy, approximately neutral buoyancy, submerged weight, and added mass forces; said shapes being flat and said shapes being curved; however, conventional helical three-fin Vortex Induced Vibration suppressing strakes featuring smooth edged, solid plan area fins that are not higher than 25% of the fin root diameter and featuring fin pitch ranges between 4 and 20 times their fin root diameters are excluded from being claimed, even when they may be used as damper devices.

What can be also optionally provided are damper devices, according to the physical principles as described above, incorporating modified conventional helical strakes; said modified strakes being provided with additional axial damping shapes; said additional axial damping shapes being installed to act together with said strakes, including said additional axial shapes being attached to said modified strakes and also including said additional shapes being mounted independently on the line between the units of the modified strakes.

Several examples of damper use are demonstrated in OTC 20180 co-authored by this inventor.

This invention has been described with reference to example embodiments that present in detail the design arrangement invented and means to achieve the novel degree of the dynamic motion suppression of catenary lines used in marine engineering. Multiple variations and modifications exist within the scope and spirit of the invention as described and defined in the following claims.

APPENDIX

References

1. I. H. Abbot & A. E. von Doenhoff, Theory of Wing Sections, Including a Summary of Airfoil Data. Dover Publications. Inc. New York.
2. Flight Training Handbook, AC 61-21 A, Flight Standards Services, Revised 1980, Federal Aviation Administration, U.S. Department of Transportation.
3. Prof. J. Kim Vandiver, Dr. Steve J. Leverette, Christopher J. Wajnikonis P. E., Dr. Hayden Marcollo, User Guide for SHEAR7 Version 4.5, For Vortex-Induced Vibrations Response Prediction of Beams or Cables with Slowly Varying Tension in Sheared or Uniform Flow, Copyright by the Massachusetts Institute of technology, Jul. 30, 2007

4. Prof. J. Kim Vandiver, Dr. Steve J. Leverette, Christopher J. Wajnikonis R E., Dr. Hayden Marcollo, User Guide for SHEAR7 Version 4.5a. For Vortex-Induced Vibrations Response Prediction of Beams or Cables with Slowly Varying Tension in Sheared or Uniform Flow, Copyright by the Massachusetts Institute of technology, Mar. 4, 2010.

5. Prof. J. Kim Vandiver, Christopher J. Wajnikonis P. E., Themistocles Resvanis and Dr. Hayden Marcollo, User Guide for SHEAR7 Version 4.6, For Vortex-induced Vibrations Response Prediction of Beams or Cables with Slowly Varying Tension in Sheared or Uniform Flow, Copyright by the Massachusetts Institute of technology, February, 2011.

6. C. J. Wajnikonis, S. Leverette, Improvements in Dynamic Loading of Ultra Deepwater Catenary Risers, OTC20180, Ocean Technology Conference, Houston, Tex. May 4-7, 2009.

Hydrodynamic Values Used in OTC20180. See Ref. 6:

TABLE 1

Hydrodynamic Values Used

| DESCRIPTION | Hydrodynamic Diameter (in) | Hydrodynamic Coefficients | | | |
|---|---|---|---|---|---|
| | | Normal | | Tangential | |
| | | Cdn | Cin | Cdt | Cit |
| Bare Pipe | 8.665 | 1.0 | 2.0 | 0.0 | 0.0 |
| Strakes | 10.665 | 2.0 | 3.0 | 0.05 | 0.06 |
| Plain Cylindrical Floats SCR WT = 1.25 in | 42.0 | 1.0 | 2.0 | 0.0 | 0.0 |
| Plain Cylindrical Floats SCR WT = 0.75 in | 36.0 | | | | |
| Floats, Dampers fitted, SCR WT = 1.25 in | 42.0 | 1.0 | 2.0 | 1.0 | 1.0 |
| Floats, Dampers fitted, SCR WT = 0.75 in | 36.0 | | | | |
| 3D Bare Pipe Dampers, SCR WT = 1.25 in | 10.665 | 2.0 | 3.0 | 3.0 | 2.7 |

What is claimed is:

1. A three-dimensional damping arrangement device mounted on a subsea line, whereas said three-dimensional damping arrangement device mounted on said subsea line is used to suppress dynamic motions of said subsea line by utilizing shaped surfaces designed to enhance hydrodynamic drag: whereas said shaped surfaces designed to enhance hydrodynamic drag are also referred to herein as damping shapes;

said subsea line including at least one of a catenary line, or a riser line, or a catenary riser, or a rigid catenary riser, or a metal catenary riser, or a steel catenary riser, or a titanium catenary riser, or an aluminum catenary riser, or a flexible catenary riser, or an umbilical line, or a tendon line, or a cable, or a tether, or a hose, or a jumper, or a tensioned riser, or a free standing riser, or a hybrid riser tower;

whereas a plurality of said three-dimensional damping arrangement devices mounted on said subsea line are mounted on said subsea line, including a single said three-dimensional damping arrangement device mounted on said subsea line; said three-dimensional damping arrangement device mounted on said subsea line incorporating said damping shapes that are mounted on said subsea line so that their combined drag per unit length of said subsea line is simultaneously enhanced by design in three mutually perpendicular directions: axial, in-plane and out-of-plane;

implementations of said damping shapes having smooth edges or said damping shapes having jagged edges; said three-dimensional damping arrangement device mounted on said subsea line having implementations utilizing planar damping shapes, or said three-dimensional damping arrangement device mounted on said subsea line utilizing curved damping shapes, or said three-dimensional damping arrangement device mounted on said subsea line utilizing damping shapes incorporating curvatures and twists;

whereas in particular implementations of said three-dimensional damping arrangement device mounted on said subsea line said damping shapes are oriented so that their combined drag per unit length of said subsea line is simultaneously enhanced by design in three mutually perpendicular directions: axial, in-plane and out-of-plane, whereas said dragger unit length in-plane and said drag per unit length out-of-plane are provided by helicoidal fins; whereas the helixes of said helicoidal fins form small angles with the axis of said subsea line that are defined by the design pitch values of said helicoidal fins and whereas said helicoidal fins essentially form strakes, and whereas said axial damping shapes added to said strakes are oriented so, that vectors normal to the surfaces of said axial damping shapes are essentially aligned with said axis of said subsea line at the mounting locations of said axial shapes on said subsea line;

whereas said axial damping shapes are combined with said strakes, or said axial damping shapes are mounted on said subsea line independently in the vicinity of said strakes.

2. The three-dimensional damping arrangement device mounted on the subsea line according to claim 1 utilizing dynamic decoupling to suppress motions.

3. The three-dimensional damping arrangement device mounted on the subsea line according to claim 2, having implementations of said three-dimensional damping arrangement device mounted on said subsea line being built by molding, or said three-dimensional damping arrangement device mounted on said subsea line utilizing prefabricated plates, or said three-dimensional damping arrangement device mounted on said subsea line being strengthened with ribs, or said three-dimensional damping arrangement device mounted on said subsea line using fiber reinforcement technology, or said three-dimensional damping arrangement device mounted on said subsea line utilizing strengthening brace members.

4. The three-dimensional damping arrangement device mounted on the subsea line according to claim 3 clamped mechanically on said subsea line on which it is mounted, whereas implementations of said clamping mechanically utilize bolts, or said clamping mechanically utilizes tape straps, or said clamping mechanically utilizes bolts and straps.

5. The three-dimensional damping arrangement device mounted on the subsea line according to claim 4 utilizing split clamp design being implemented as a symmetrically split clamp, or being implemented as an asymmetrically split clamp, or being implemented as a clamp design split on one side.

6. The three-dimensional damping arrangement device mounted on the subsea line according to claim 1 having implementations incorporating said damping shapes provided with slots, or said three-dimensional damping arrangement device incorporating said damping shapes provided with holes, or said three-dimensional damping arrangement device mounted on said subsea line incorporating said damping shapes provided with slots and holes.

7. The three-dimensional damping arrangement device mounted on the subsea line according to claim 6, having implementations of said three-dimensional damping arrangement device mounted on said subsea line being built by molding, or said three-dimensional damping arrangement device mounted on said subsea line utilizing prefabricated plates, or said three-dimensional damping arrangement device mounted on said subsea line being strengthened with ribs, or said three-dimensional damping arrangement device mounted on said subsea line using fiber reinforcement technology, or said three-dimensional damping arrangement device mounted on said subsea line utilizing strengthening brace members.

8. The three-dimensional damping arrangement device mounted on the subsea line according to claim 7 clamped mechanically on said subsea line on which it is mounted, whereas implementations of said clamping mechanically utilize bolts, or said clamping mechanically utilizes tape straps, or said clamping mechanically utilizes bolts and straps.

9. The three-dimensional damping arrangement device mounted on the subsea line according to claim 8 utilizing split clamp design being implemented as a symmetrically split clamp, or being implemented as an asymmetrically split clamp, or being implemented as a clamp design split on one side.

10. The three-dimensional damping arrangement device mounted on the subsea line according to claim 1 having implementations of said three-dimensional damping arrangement device being built by molding, or said three-dimensional damping arrangement device utilizing prefabricated plates, or said three-dimensional damping arrangement device mounted on said subsea line being strengthened with ribs, or said three-dimensional damping arrangement device mounted on said subsea line using fiber reinforcement technology, or said three-dimensional damping arrangement device mounted on said subsea line utilizing strengthening brace members.

11. The three-dimensional damping arrangement device mounted on the subsea line according to claim 10 clamped mechanically on said subsea line on which it is mounted, whereas implementations of said clamping mechanically utilize bolts or said clamping mechanically utilizes tape straps, or said clamping mechanically utilizes bolts and straps.

12. The three-dimensional damping arrangement device mounted on the subsea line according to claim 11 utilizing split clamp design being implemented as a symmetrically split clamp, or being implemented as an asymmetrically split clamp, or being implemented as a clamp design split on one side.

13. The three-dimensional damping arrangement device mounted on the subsea line according to claim 1, whereas said three-dimensional damping arrangement device is installed on said subsea line on which it is mounted using an adhesive or using welding.

14. The three-dimensional damping arrangement device mounted on the subsea line according to claim 1, implementations of which include said three-dimensional damping arrangement device mounted on said subsea line that is installed on a newly designed said subsea line or said three-dimensional damping arrangement device mounted on said subsea line is retrofitted on a previously installed said subsea line.

15. A lazy wave configuration of a rigid catenary riser, including at least one of a metal catenary riser, or a steel catenary riser, or a titanium catenary riser, or an aluminum catenary riser used in offshore engineering; whereas the length of the positively buoyant segment of said lazy wave configuration of said rigid catenary riser does not exceed the length of 15% of the design water depth and said positively buoyant segment of said lazy wave configuration of said rigid catenary riser is located so, that said positively buoyant segment of said lazy wave configuration of said rigid catenary riser lies in the lower ⅜ of the suspended length of said rigid catenary riser.

16. The lazy wave configuration of said rigid catenary riser according to claim 15, whereas a plurality of three-dimensional damping arrangement devices are mounted on said lazy wave configuration of said rigid catenary riser, including a single said three-dimensional damping arrangement device mounted on said lazy wave configuration of said rigid catenary riser; said three-dimensional damping arrangement device incorporating damping shapes that are mounted on said lazy wave configuration of said rigid catenary riser so that their combined drag per unit length of said rigid catenary riser is simultaneously effective in three mutually perpendicular directions: axial, in-plane and out-of-plane; implementations of said damping shapes including at least said damping shapes having smooth edges or said damping shapes having jagged edges; whereas implementations of said three-dimensional damping arrangement device utilize planar said damping shapes, or said three-dimensional damping arrangement device utilizing curved damping shapes, or said three-dimensional damping arrangement device utilizing said damping shapes incorporating curvatures and twists, or said three-dimensional damping arrangement device incorporating axial damping shapes added to strakes, or said three-dimensional damping arrangement device combining strakes providing in-plane and out-of-plane damping with axial damping shapes mounted independently on said lazy wave configuration rigid catenary riser.

17. The three-dimensional damping arrangement device according to claim 16 utilizing dynamic decoupling to suppress motions.

18. The three-dimensional damping arrangement device according to claim 16 including said three-dimensional damping arrangement device having implementations incorporating said damping shapes provided with slots, or said three-dimensional damping arrangement device incorporating said damping shapes provided with holes, or said three-dimensional damping arrangement device provided with slots and holes.

19. The lazy wave configuration of said rigid catenary riser according to claim 15, whereas said lazy wave configuration of a rigid catenary riser is obtained from a free hanging rigid riser configuration by retrofitting positive buoyancy on a pre-existing free hanging rigid riser.

\* \* \* \* \*

UNITED STATES PATENT AND TRADEMARK OFFICE
CERTIFICATE OF CORRECTION

PATENT NO. : 8,888,411 B2  
APPLICATION NO. : 12/772992  
DATED : November 18, 2014  
INVENTOR(S) : Krzysztof Jan Wajnikonis Page 1 of 1

It is certified that error appears in the above-identified patent and that said Letters Patent is hereby corrected as shown below:

In The Specification  
Column 12, Line 65: Please replace: 'i-lay' with 'J-lay'.  
Column 27, Line 4: Please replace: 'R E.' with 'P.E.'.  
Column 27, Table 1, Line 32: Please replace: '0.06' with '0.05'.

In The Claims  
Claim 1, Column 28, Line 20: Please replace: 'dragger' with 'drag per'.

Signed and Sealed this  
Twenty-seventh Day of January, 2015

Michelle K. Lee  
*Deputy Director of the United States Patent and Trademark Office*